United States Patent
Mok

(10) Patent No.: US 12,217,642 B2
(45) Date of Patent: Feb. 4, 2025

(54) ELECTRONIC DEVICE AND METHOD FOR DRIVING THE SAME

(71) Applicant: Samsung Display Co., LTD., Yongin-si (KR)

(72) Inventor: Rang Kyun Mok, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/392,300

(22) Filed: Dec. 21, 2023

(65) Prior Publication Data
US 2024/0339059 A1     Oct. 10, 2024

(30) Foreign Application Priority Data
Apr. 7, 2023   (KR) .................... 10-2023-0046085

(51) Int. Cl.
| | |
|---|---|
| G09G 3/02 | (2006.01) |
| G06F 3/01 | (2006.01) |
| G06F 3/0346 | (2013.01) |
| G09G 3/3225 | (2016.01) |
| H04N 9/31 | (2006.01) |

(52) U.S. Cl.
CPC ............. *G09G 3/025* (2013.01); *G06F 3/017* (2013.01); *G06F 3/0346* (2013.01); *G09G 3/3225* (2013.01); *H04N 9/3105* (2013.01); *H04N 9/3164* (2013.01); *H04N 9/317* (2013.01); *H04N 9/3185* (2013.01); *G09G 2340/0492* (2013.01); *G09G 2354/00* (2013.01)

(58) Field of Classification Search
None
See application file for complete search history.

(56) References Cited

U.S. PATENT DOCUMENTS 11,615,639 B1 *   3/2023   Klein .................... G06V 40/14
                                                    382/115

FOREIGN PATENT DOCUMENTS

| KR | 10-1122199 B1 | 3/2012 |
|---|---|---|
| KR | 10-1315971 B1 | 10/2013 |
| KR | 2016-0125853 A | 11/2016 |
| KR | 2021-0001874 U | 8/2021 |
| KR | 2022-0101682 A | 7/2022 |

\* cited by examiner

*Primary Examiner* — Duane N Taylor, Jr.
(74) *Attorney, Agent, or Firm* — Womble Bond Dickinson

(57) ABSTRACT

According to one or more embodiments, an electronic device may include a main body, a sensor exposed to an outside through the main body, a display inside the main body, and configured to output a beam image through a lens exposed through the main body, a posture controller outside the display, and including gimbals configured to change a posture of the display, a driver configured to drive the posture controller, and a processor that is configured to track a user's hand position using the sensor, change the posture of the display based on the tracked hand position, move the lens such that an axis of the lens faces a palm of the user's hand, calculate a distance between the palm and the lens, and control the display to output the beam image generated based on the calculated distance.

20 Claims, 18 Drawing Sheets

FIG. 3
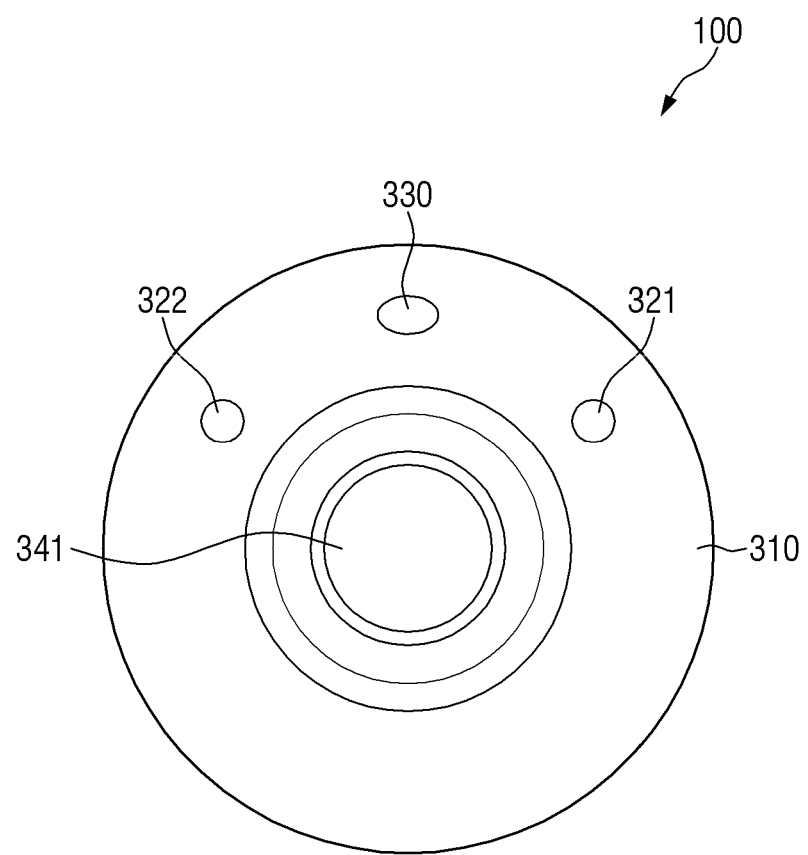
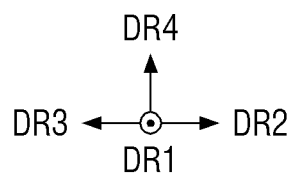

FIG. 5
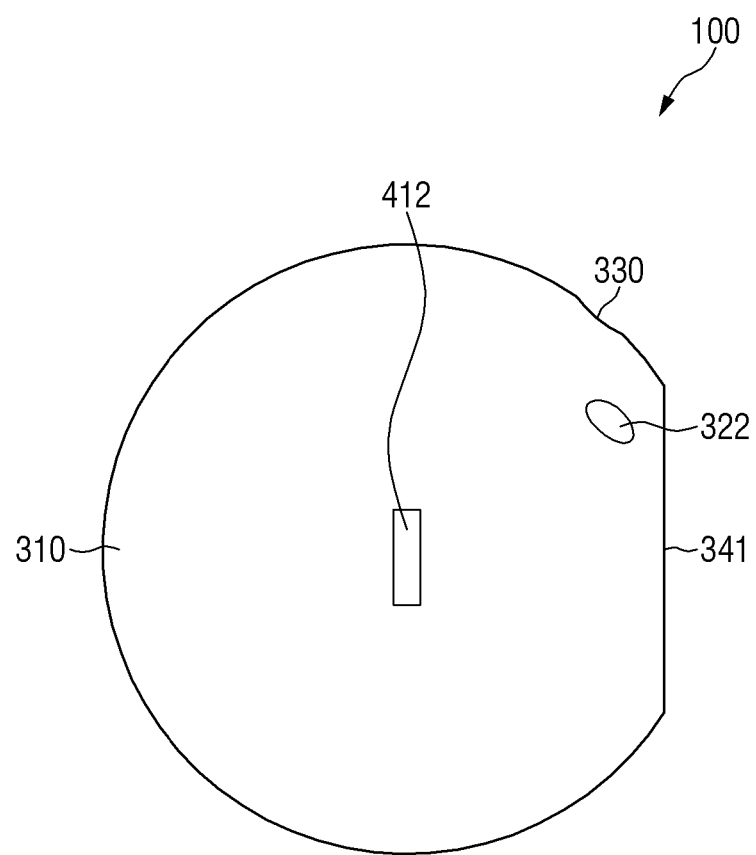
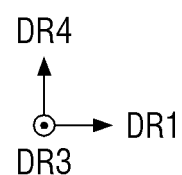

840: 841, 842, 843

1110: 1111, 1112, 1113
1120: 1121, 1122, 1123

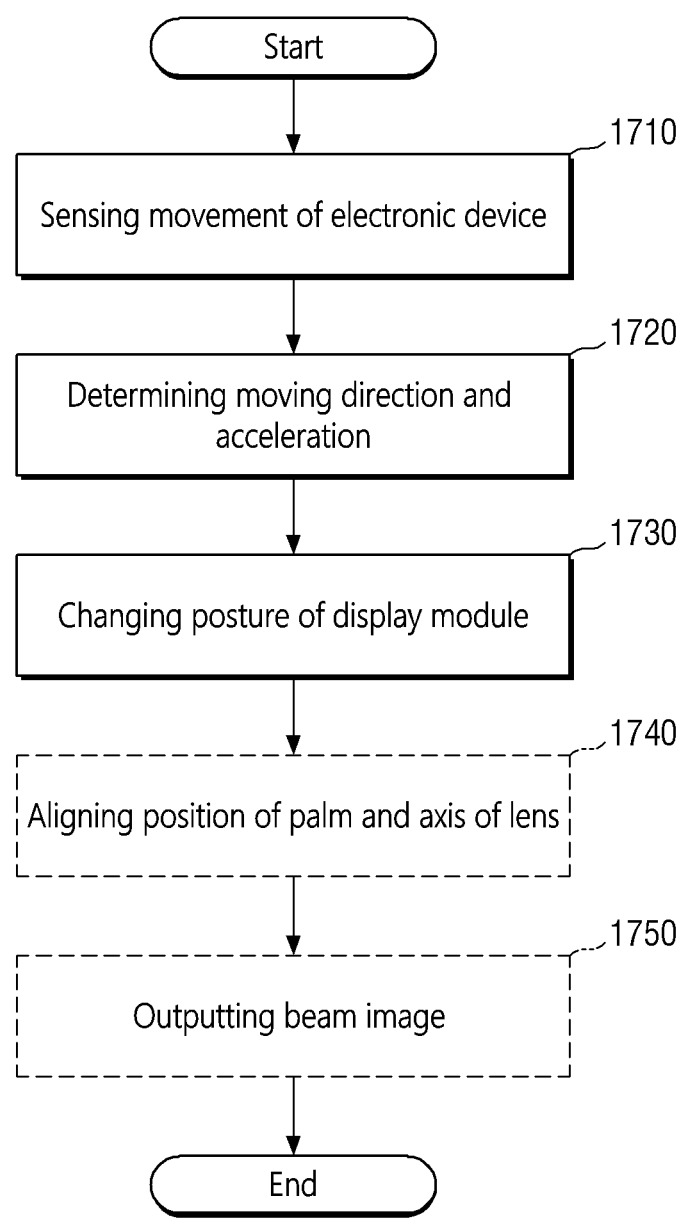

ELECTRONIC DEVICE AND METHOD FOR DRIVING THE SAME

CROSS-REFERENCE TO RELATED APPLICATION

The present application claims priority to, and the benefit of, Korean Patent Application No. 10-2023-0046085, filed on Apr. 7, 2023, in the Korean Intellectual Property Office, the entire disclosure of which is incorporated herein by reference.

BACKGROUND

1. Field

The present disclosure relates to an electronic device, and a method for driving the same.

2. Description of the Related Art

With the advancement of display technology, research and development on an electronic device having a rollable display (or flexible display) has been actively conducted. The electronic device has been gradually transformed from a uniform rectangular shape to a variety of shapes. For example, the electronic device has been researched and developed to have a form factor that allows a display to be fold, bent, rolled, or unfolded by applying a rollable display.

In addition, the electronic device may include a display device, which is a high-resolution small-sized organic light-emitting display device, and to which organic light-emitting diode on silicon (OLEDoS) technology is applied, to provide a display specification (e.g., resolution) of about 2000 pixels per inch (PPI) or more. The OLEDoS is technology that places an organic light-emitting diode (OLED) on a semiconductor wafer substrate on which a complementary metal oxide semiconductor (CMOS) is located.

SUMMARY

Aspects of the present disclosure provide an electronic device with a novel form factor that outputs a beam image using a display device to which the OLEDoS technology is applied, and a method for driving the same.

According to one or more embodiments of the present disclosure, an electronic device may include a main body, a sensor exposed to an outside through the main body, a display inside the main body, and configured to output a beam image through a lens exposed through the main body, a posture controller outside the display, and including gimbals configured to change a posture of the display, a driver configured to drive the posture controller, and a processor that is configured to track a user's hand position using the sensor, change the posture of the display based on the tracked hand position, move the lens such that an axis of the lens faces a palm of the user's hand, calculate a distance between the palm and the lens, and control the display to output the beam image generated based on the calculated distance.

The sensor may include a first infrared sensor, and a second infrared sensor spaced apart from the first infrared sensor.

The first infrared sensor and the second infrared sensor may have a field of view that is greater than or equal to about 60 degrees.

The gimbals may include a first gimbal configured to rotate the display about a first axis, a second gimbal configured to rotate the display about a second axis that is perpendicular to the first axis, and a third gimbal configured to rotate the display about a third axis that is perpendicular to the first axis and the second axis.

The driver may include a first driving motor configured to drive the first gimbal, a second driving motor configured to drive the second gimbal, and a third driving motor configured to drive the third gimbal, wherein the first to third driving motors include an annular piezoelectric element, a fixing portion contacting the annular piezoelectric element, and including a protrusion, a disk-shaped rotating portion contacting the fixing portion, and a friction ring between the fixing portion and the disk-shaped rotating portion, and contacting the protrusion.

The display may include a display portion including at least one display panel and a prismatic portion for transmitting display light emitted from the display panel to the lens, and a lens portion adjacent to the display portion, and including the lens and a shift motor for shifting the lens.

The lens portion may include a reflective member, wherein the display portion includes an optical sensor for receiving light reflected by the reflective member, and wherein the processor is configured to sense light reflected by the reflective member using the optical sensor, and to control the shift motor to align the lens portion and the display portion based on the sensed light.

The display may include a first display panel for emitting red light, a second display panel for emitting green light, and a third display panel for emitting blue light, and wherein the prism portion includes a trichroic prism for transmitting the red light, the green light, and the blue light to the lens.

The processor may be configured to determine finger coordinates while outputting the beam image, sense a user gesture based on the determined finger coordinates, and perform a function based on the sensed user gesture.

The function based on the sensed user gesture may include an operation of sensing a user input to a text input window.

At least one display panel may include a semiconductor wafer substrate, and an organic light-emitting diode (OLED) on the semiconductor wafer substrate.

The sensor may further include a gyro sensor, wherein the processor is configured to sense a movement of the electronic device using the gyro sensor while outputting the beam image, determine a direction and an acceleration of the electronic device, and change a posture of the display based on the determined direction and the determined acceleration.

According to one or more embodiments of the present disclosure, a method for driving an electronic device, which includes a sensor exposed to an outside through a main body, a display inside the main body for outputting a beam image through a lens exposed through the main body, a posture controller outside the display and including gimbals configured to change a posture of the display, and a driver configured to drive the posture controller, includes tracking a user's hand position using the sensor, changing the posture of the display based on the user's hand position, moving the lens such that an axis of the lens faces a palm, calculating a distance between the palm and the lens, and controlling the display to output the beam image generated based on the calculated distance.

The gimbals may include a first gimbal configured to rotate the display about a first axis, a second gimbal configured to rotate the display about a second axis that is perpendicular to the first axis, and a third gimbal configured to rotate the display about a third axis that is perpendicular to the first axis and the second axis.

The changing the posture of the display may include at least one of rotating the display about the first axis by driving the first gimbal, rotating the display about the second axis by driving the second gimbal, or rotating the display about the third axis by driving the third gimbal.

The display may include a display portion including at least one display panel and a prismatic portion for transmitting display light emitted from the display panel to the lens, and a lens portion adjacent to the display portion, and including the lens and a shift motor for shifting the lens.

The lens portion may include a reflective member, wherein the display portion includes an optical sensor for receiving light reflected by the reflective member, and wherein the method further includes sensing the light reflected by the reflective member using the optical sensor, and controlling the shift motor to align the lens portion and the display portion based on the sensed light.

The method may further include determining finger coordinates while outputting the beam image, sensing a user gesture based on the determined finger coordinates, and performing a function based on the sensed user gesture.

The function based on the sensed user gesture may include sensing a user input to a text input window.

The sensor may include a gyro sensor, wherein the method further includes sensing a movement of the electronic device using the gyro sensor while outputting the beam image, determining a direction and an acceleration of the electronic device, and changing a posture of the display based on the determined direction and the determined acceleration.

In the electronic device and its driving method according to embodiments, it is possible to provide a user with a novel form factor that outputs a beam image using a display device to which OLEDoS technology is applied.

In addition, the electronic device may be manufactured in a smaller volume than a smartphone while providing a display specification (e.g., resolution) of about 2000 PPI or more, thereby providing portability and convenience of allowing the user to view a high-quality image on a large screen without having to carry a smartphone or tablet PC.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects of the present disclosure will become more apparent by describing in detail embodiments thereof with reference to the attached drawings, in which:

FIG. 3 illustrates a front view of an electronic device according to one or more embodiments;

FIG. 5 illustrates another side view of an electronic device according to one or more embodiments;

FIG. 17 is a flowchart illustrating an operation of compensating shaking by an electronic device according to one or more embodiments.

DETAILED DESCRIPTION

Figure 1:
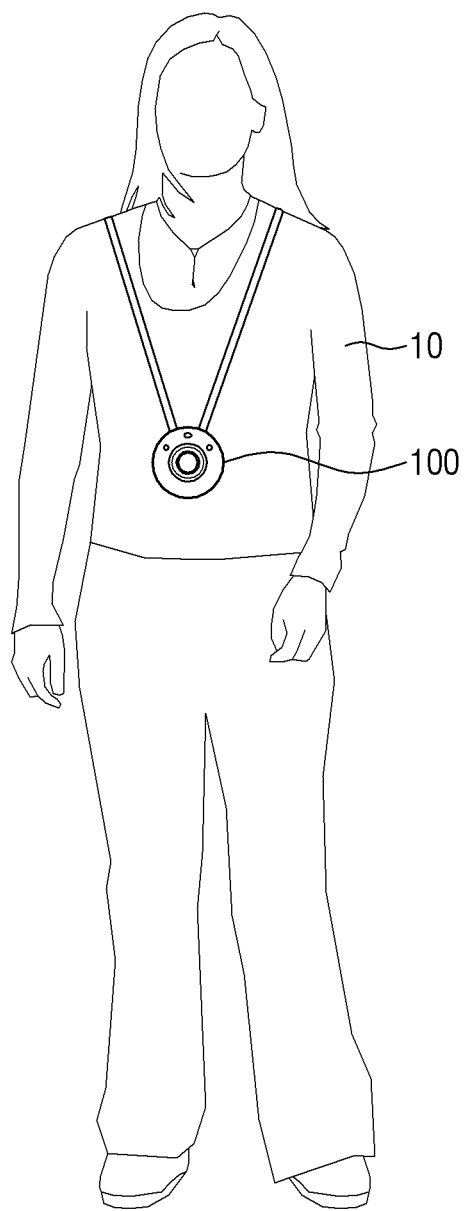
FIG. 1 is a conceptual diagram illustrating a state in which a user wears an electronic device according to one or more embodiments.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The present disclosure covers all modifications, equivalents, and replacements within the idea and technical scope of the present disclosure. Further, each of the features of the various embodiments of the present disclosure may be combined or combined with each other, in part or in whole, and technically various interlocking and driving are possible. Each embodiment may be implemented independently of each other or may be implemented together in an association.

In the drawings, the relative sizes of elements, layers, and regions may be exaggerated for clarity and/or descriptive purposes. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. In other instances, well-known structures and devices are shown in block diagram form to avoid unnecessarily obscuring various embodiments.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to" may be construed similarly. It will be understood that when an element or layer is referred to as being "between" two elements or layers, it can be the only element or layer between the two elements or layers, or one or more intervening elements or layers may also be present.

For the purposes of this disclosure, expressions, such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression, such as "at least one of A and B" and "at least one of A or B" may include A, B, or A and B. As used herein, "or" generally means "and/or," and the term "and/or" includes any and all combinations of one or more of the associated listed items. For example, the expression, such as "A and/or B" may include A, B, or A and B. Similarly, expressions, such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third (or fourth) directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
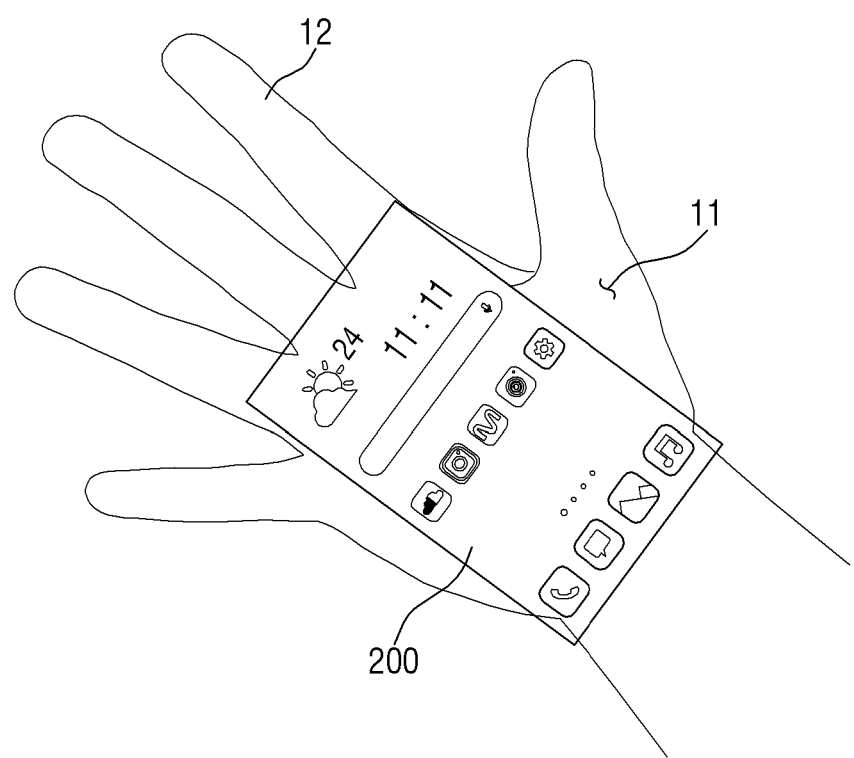
FIG. 2 is a conceptual diagram illustrating a state in which an electronic device according to one or more embodiments outputs a beam image.

FIG. 1 is a conceptual diagram illustrating a state in which a user wears an electronic device 100 according to one or more embodiments. FIG. 2 is a conceptual diagram illustrating a state in which an electronic device 100 according to one or more embodiments outputs a beam image 200.

Referring to FIG. 1, the electronic device 100 according to one or more embodiments is a device that outputs the beam image 200, and that is a portable electronic device 100 that a user 10 can wear around their neck in the form of a necklace. However, the electronic device 100 is not limited to having a necklace-shaped form factor. In the present disclosure, the electronic device 100 may be in any form, as long as it is portable and includes a function of outputting the beam image 200.

Figure 7:
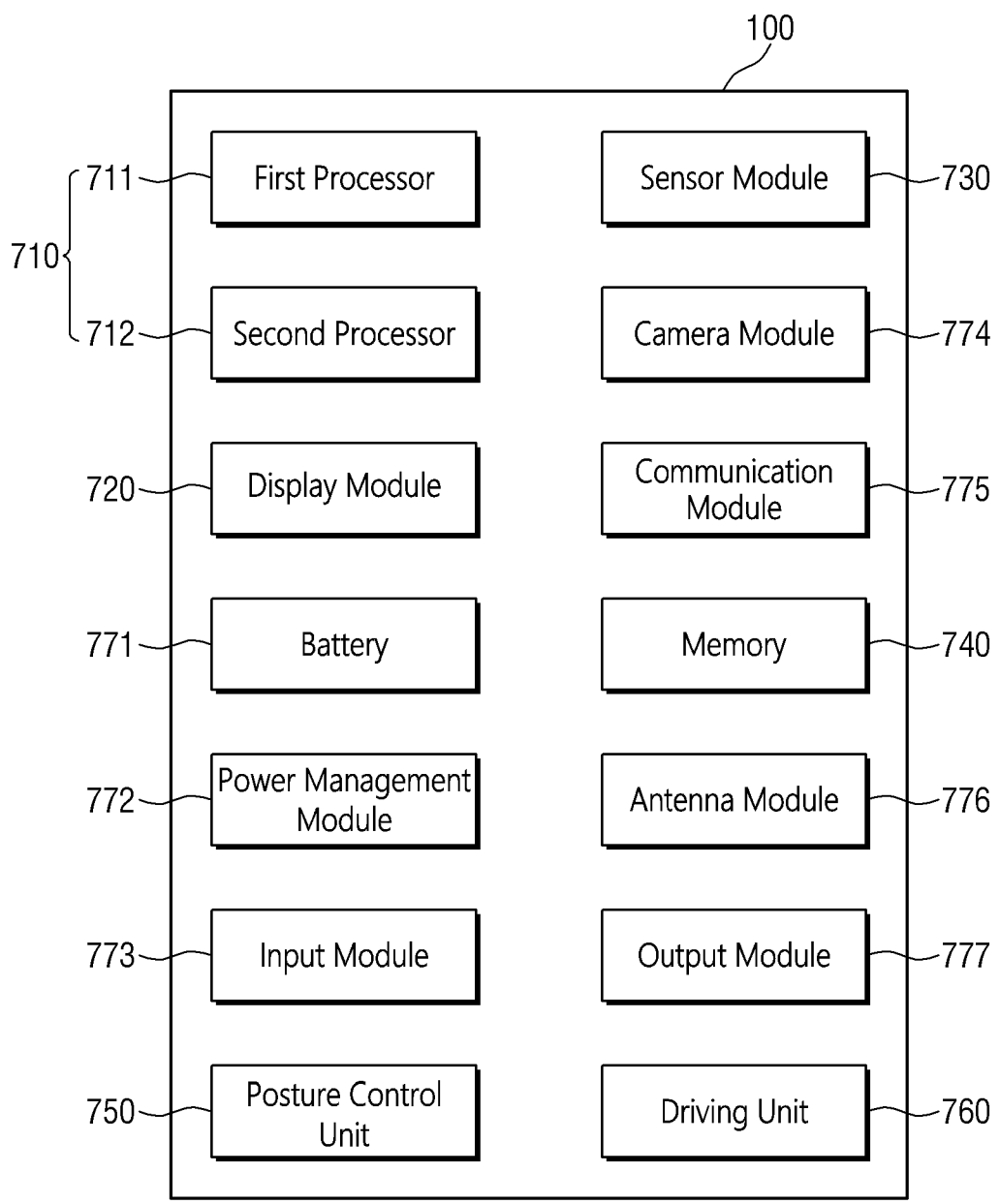
FIG. 7 is a block diagram of an electronic device according to one or more embodiments.

According to one or more embodiments, the electronic device 100 may include a display device (e.g., a display or display module 720, as shown in FIG. 7) that generates the beam image 200, and the beam image 200 generated by the display device may be outputted to the outside through a lens 341 (see FIG. 3) of the electronic device 100. As shown in FIG. 3, the lens 341 may be exposed to the outside through at least a part of a main body 310 of the electronic device 100. The display device that generates the beam image 200 may be located in the main body 310 of the electronic device 100, and the beam image 200 generated by the display device may be emitted to the outside of the electronic device 100 through the lens 341.

The display device includes a display panel 1120 (see FIG. 11) to which organic light-emitting diode on silicon (OLEDoS) technology is applied. Accordingly, the electronic device 100 may be easily manufactured in a small size and may be more portable. In addition, the display device to which the OLEDoS technology is applied may have a resolution of about 2000 PPI (pixels per inch) or more, which enables the electronic device 100 to provide a high-quality image to a user 10. As such, the electronic device 100 may be implemented with a volume that is smaller than that of a typical smartphone, and may enhance portability and convenience, by including the display device to which the OLEDoS technology is applied.

The OLEDoS is technology that places an organic light-emitting diode (OLED) on a semiconductor wafer substrate on which a complementary metal oxide semiconductor (CMOS) is located. However, the present disclosure is not limited to the display panel 1120 (see FIG. 11) of the display device being an OLEDoS type. For example, the display panel 1120 may be one to which a micro light-emitting diode (LED) or a light-emitting diode on silicon (LEDoS) is applied. The following description will focus on the display panel 1120 of the display device being of an OLEDOS type, but the present disclosure is not limited thereto.

Referring to FIG. 2, the beam image 200 generated by the display device of the electronic device 100 may be substantially the same as an image provided by a typical smartphone. The beam image 200 may include, for example, a home screen, an execution screen of an application program, and a text input window. The electronic device 100 may include a memory 740 (see FIG. 7) that stores an application program, and a processor 710 (see FIG. 7) that executes the application program stored in the memory 740. The processor 710 may control the display device to generate a corresponding screen based on the executed application program. FIG. 2 illustrates, in one example, a home screen of the beam image 200, but the beam image 200 may be variously changed under the control of the processor 710. The home screen may be named a "start screen," "main screen," or "background screen." The home screen may refer to a basic screen of a graphical user interface provided by an operating system of the electronic device 100. The appearance of the home screen may vary depending on the type of operating system stored in the memory 740 of the electronic device 100.

The electronic device 100 may be configured to display the beam image 200 over a user's palm 11. To this end, the electronic device 100 may include a sensor or sensor module 730 (see FIG. 7) for tracking the positions of the user's palm 11 and fingers 12. The electronic device 100 may use the sensor 730 to track the position of the user's palm 11, and may output the beam image 200 toward the tracked user's palm 11. That is, the electronic device 100 may use the sensor 730 to identify the user's fingers 12 and the user's palm 11, and may output the beam image 200 over the palm 11, which has a relatively larger area than the fingers 12. The electronic device 100 may provide a function of adjusting the aspect ratio of the beam image 200 and the size of the beam image 200 based on a user's input, and may control the display device to output the beam image 200 over the user's fingers 12 as well as over the user's palm 11. The sensor 730 for tracking the positions of the user's palm 11 and fingers 12 may be, for example, infrared sensors 321 and 322 (see FIG. 3), as will be described later with reference to FIGS. 3 to 6.

The electronic device 100 may include a posture/orientation controller (e.g., posture/orientation control unit) 750 (see FIG. 7) for changing the posture of the display device (e.g., the display 720) within the main body 310 to ensure that the beam image 200 is directed at the user's palm 11. The electronic device 100 tracks the user's palm 11, and uses the posture controller 750 to change the posture/orientation of the display 720. The electronic device 100 may cause the repositioned display 720 to display the beam image 200 over the user's palm 11 through the lens 341. The posture of the display 720 refers to a direction in which the display 720 is placed. For example, when the posture of the display 720 changes from a first state to a second state, an angle formed by the central axis of the lens 341 and the display 720 may change. For example, when the posture of the display 720 changes from the first state to the second state, an incidence angle at which display light, which is generated by the display 720, is incident on the lens 341 may change. Alternatively, when the posture of the display 720 changes from the first state to the second state, the incidence angle at which the display light is incident on the lens 341 may be fixed, but the direction of the central axis of the lens 341 may change as the lens 341 is tilted to a corresponding angle.

Figure 4:
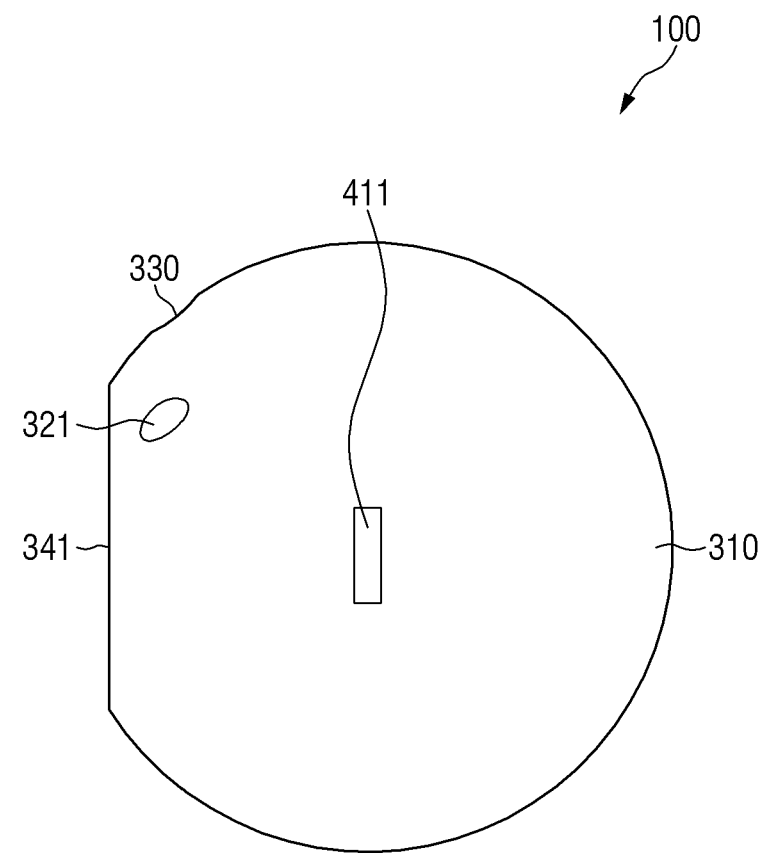
FIG. 4 illustrates a side view of an electronic device according to one or more embodiments.
Figure 6:
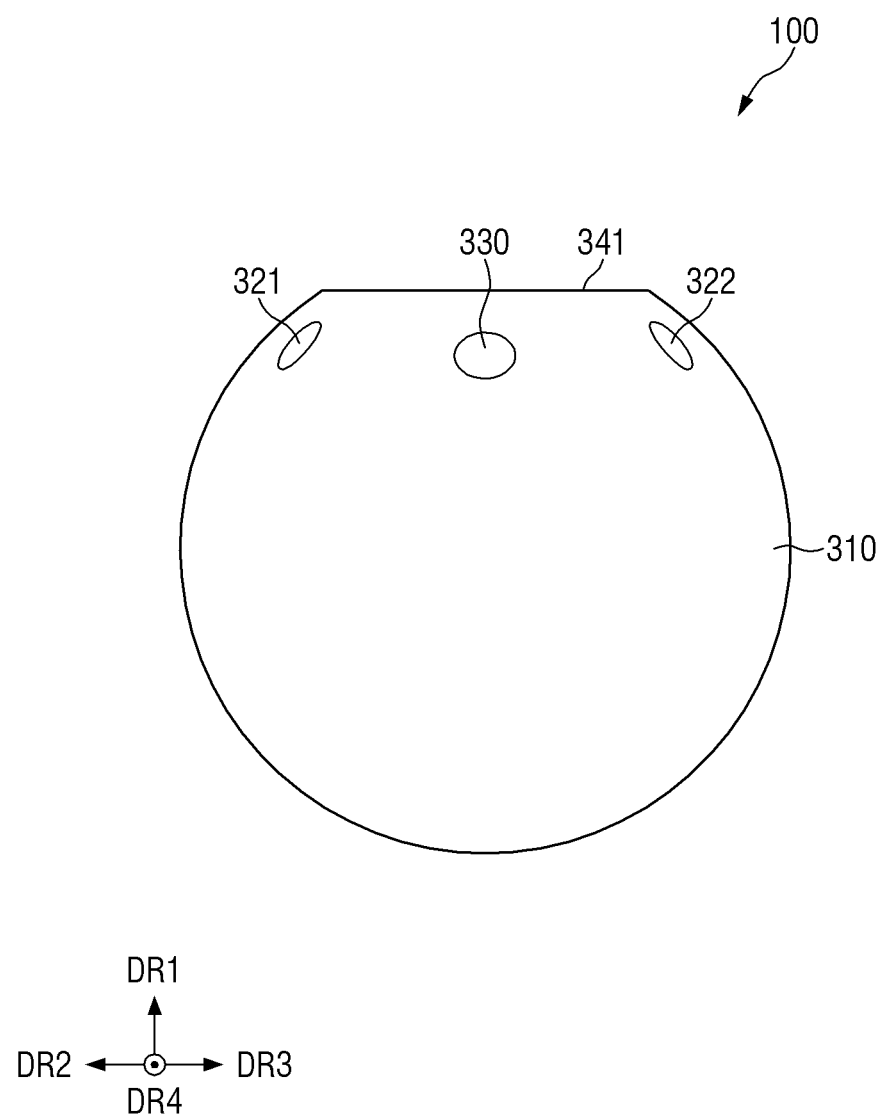
FIG. 6 illustrates a top view of an electronic device according to one or more embodiments.

FIG. 3 illustrates a front view of an electronic device 100 according to one or more embodiments. FIG. 4 illustrates a side view of an electronic device 100 according to one or more embodiments. FIG. 5 illustrates another side view of an electronic device 100 according to one or more embodiments. FIG. 6 illustrates a top view of an electronic device 100 according to one or more embodiments.

Referring to FIGS. 3 to 6, the exterior of the electronic device 100 (e.g., the shape of the main body 310 or housing) may be a spherical shape as a whole, but is not limited thereto. That is, in the illustrated example, the exterior of the electronic device 100 has a spherical shape, but the main body 310 forming the exterior of the electronic device 100 may have the shape of a polyhedron including six or more faces.

A space may be provided inside the main body 310, and in the space inside the main body 310, components of the electronic device 100 described herein may be located. For example, the display 720 of the display device may be located in the space inside the main body 310, and the posture controller 750 including a plurality of gimbals configured to change the posture of the display 720 may be located outside the display 720. Inside the main body 310, the posture of the display 720 may be changed by the posture controller 750.

At least a part of the sensor 730 may be exposed on the exterior the main body 310. The sensor 730 may include the infrared sensors 321 and 322 for tracking the user's fingers 12 and palm 11, a gyro sensor 330 for sensing movement (e.g., change in posture) of the electronic device 100, and/or the like. The electronic device 100 may include the plurality of infrared sensors 321 and 322 to increase the accuracy of sensing. For example, the electronic device 100 includes two or more infrared sensors 321 and 322. The electronic device 100 may include a first infrared sensor 321 and a second infrared sensor 322. The first infrared sensor 321 and the second infrared sensor 322 may be arranged to be spaced apart from each other. Each of the first infrared sensor 321 and the second infrared sensor 322 may have a field of view that is greater than or equal to about 60 degrees. The first infrared sensor 321 and the second infrared sensor 322 may be arranged to be symmetrical to each other with respect to the lens 341. For example, the first infrared sensor 321 may be spaced apart from the lens 341 by a first distance, and may be located closer to a first side surface than the second infrared sensor 322. The second infrared sensor 322 may be spaced from the lens 341 by the first distance, and may be located closer to a second side surface than the first infrared sensor 321. Here, the first side surface refers to a surface located on the right of the lens 341 when the lens 341 is viewed from the front. The second side surface is a surface opposite to the first side surface, and refers to a surface located on the left of the lens 341 when the lens 341 is viewed from the front.

Herein, a surface on which a part of the lens 341 is exposed is defined as the front surface of the electronic device 100. The rear surface of the electronic device 100 is defined as the opposite surface of the front surface. Further, a surface surrounding a space between the front surface and the rear surface is defined as the side surface of the electronic device 100. For example, FIG. 4 may be a view depicting the first side surface of the electronic device 100. For example, FIG. 5 may be a view depicting the second side surface of the electronic device 100. As shown in FIGS. 4 and 5, physical keys 411 and 412 may be respectively located on the first side surface and/or the second side surface of the main body 310. In one or more other embodiments, the physical keys 411 and 412 may be located on each of the first side surface and the second side surface, or may be located on any one of the first side surface and/or the second side surface. Alternatively, the physical keys 411 and 412 may be located on the top surface of the electronic device 100.

It should be noted that the location of the gyro sensor 330 is not limited to the illustrated example, and may be located within the main body 310.

In one or more embodiments, at least one lighting device (e.g., LED light), or an output device, such as a speaker, may be exposed through a part of the main body 310. The lighting device may include an LED light, and may output light in various patterns (e.g., blinking and always-on), and may output light in various colors indicative of a state (e.g., power on/off state, state associated with communications, state associated with a battery 771) of the electronic device 100.

In one or more embodiments, at least one connector may be exposed through a part of the main body 310. The connector refers to a terminal that can be physically connected to an external electronic device through a cable of a designated specification. For example, the connector may include an HDMI connector, a USB connector, an SD card connector, or an audio connector (e.g., headphone connector).

FIG. 7 is a block diagram of an electronic device 100 according to one or more embodiments. The electronic device 100 shown in FIG. 7 may be the electronic device 100 described with reference to FIGS. 1 to 6.

Referring to FIG. 7, the electronic device 100 according to one or more embodiments may include the processor 710, the display 720, the sensor 730, the memory 740, the posture controller 750, and a driver (e.g., driving unit) 760. In addition, similarly to a typical smartphone (or tablet PC), the electronic device 100 according to one or more embodiments may further include the battery 771, a power manager/power management module 772, an input module 773, a camera/camera module 774, a communicator/communication module 775, an antenna/antenna module 776, and an output module 777.

The processor 710 may, for example, execute software (e.g., program) to control at least one other component (e.g., hardware or software component) of the electronic device 100 connected to the processor 710, and may perform various data processing or computations. According to one or more embodiments, as at least part of the data processing or computations, the processor 710 may store commands or data received from other components (e.g., sensor 730 or communicator 775) in a volatile memory, may process the commands or data stored in the volatile memory, and may store the resulting data in a non-volatile memory.

The processor 710 may include a first processor 711 (e.g., coprocessor, central processing unit, or application processor 710) or a second processor 712 (e.g., coprocessor, graphics processing unit, neural processing unit (NPU), image signal processor 710, sensor hub processor 710, or communication processor 710) that may operate independently of, or in conjunction with, the first processor 711. For example, if the electronic device 100 includes the first processor 711 and the second processor 712, the second processor 712 may be configured to use less power than the first processor 711 or to be specialized for a designated function.

The second processor 712 may control at least some of the functions or states associated with at least one component (e.g., display 720, sensor 730, or communicator 775) of the electronic device 100, for example, on behalf of the first processor 711 while the first processor 711 is in an inactive (e.g., sleeping) state, or in conjunction with the first processor 711 while the first processor 711 is in an active (e.g., running an application) state. According to one or more embodiments, the second processor 712 (e.g., image signal processor 710 or communication processor 710) may be implemented as a part of another component (e.g., camera 774 or communicator 775) that is functionally related thereto.

The memory 740 may store various data used by at least one component (e.g., processor 710 or sensor 730) of the electronic device 100. The data may include, for example, input data or output data for software (e.g., program) and instructions associated therewith. The memory 740 may include the volatile memory or the non-volatile memory. A program may be stored as software in the memory 740, and may include, for example, an operating system, middleware, or an application program.

The display 720 may visually present information (e.g., beam image 200) to the outside (e.g., user) of the electronic device 100. The display 720 may include, for example, a holographic device, or a projector and a control circuit for controlling the device.

The sensor 730 may detect an operational state (e.g., power or temperature) of the electronic device 100, or an external environmental state (e.g., user state), and may generate an electrical signal or a data value corresponding to the detected state. According to one or more embodiments, the sensor 730 may include at least one of, for example, a gesture sensor, the gyro sensor 330, a barometric pressure sensor, a magnetic sensor, an acceleration sensor, a grip sensor, a proximity sensor, a color sensor, an infrared (IR) sensor, a biometric sensor, a temperature sensor, a humidity sensor, and/or an illumination sensor.

Figure 8:
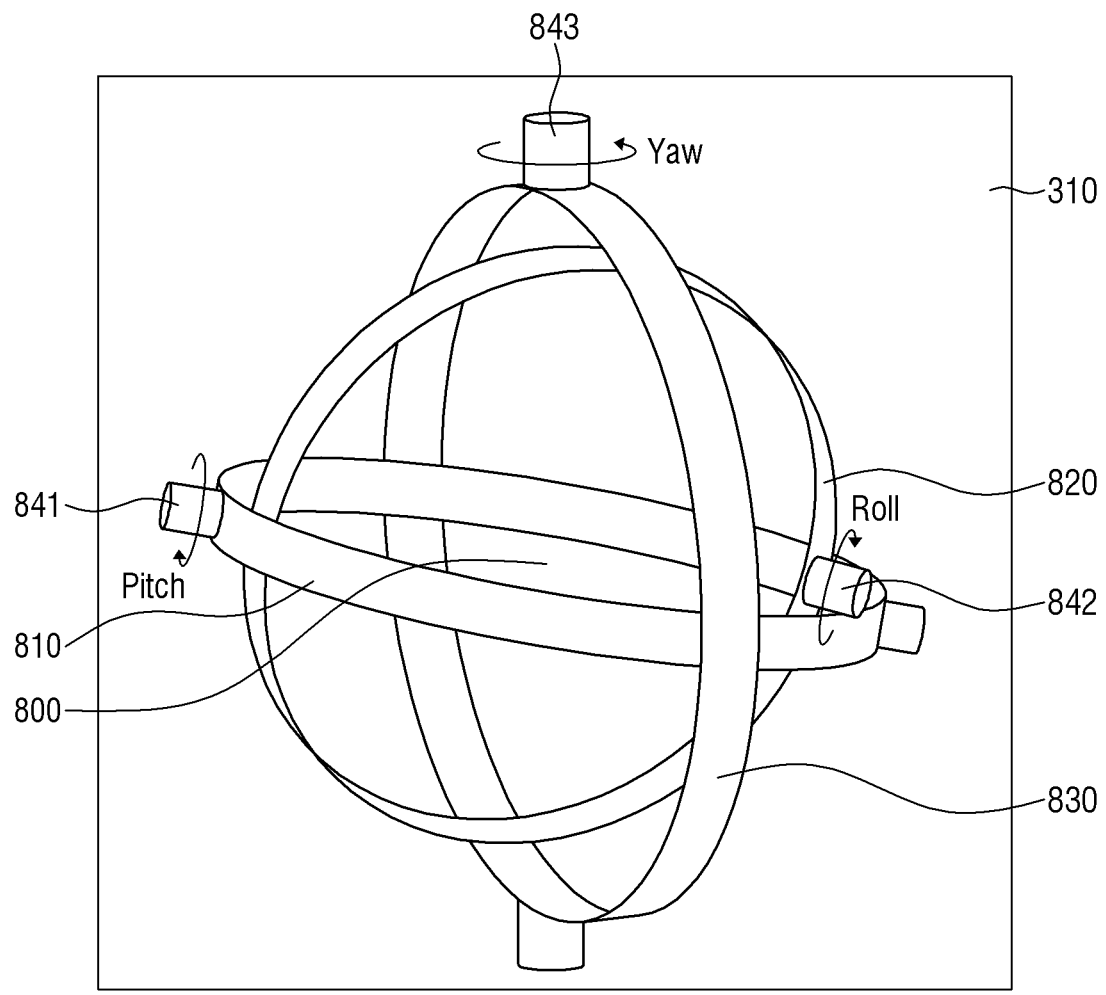
FIG. 8 is a perspective view illustrating a posture controller located in a housing.

The posture controller 750 may be located inside the main body 310, and may be configured to change the posture of the display 720 at the outside of the display 720. The posture controller 750 may include a plurality of gimbals. The posture controller 750 may include a three-axis gimbal. As shown in FIG. 8, the rotational motion of an object in a three-dimensional space includes "Pitch," which is rotation about a lateral axis, "Roll," which is rotation about a longitudinal axis, and "Yaw," which is rotation about a vertical axis. The posture controller 750, in conjunction with the gyro sensor 330 or the acceleration sensor located in the main body 310, corrects the posture of the display 720 in a direction opposite to the moving direction of the electronic device 100. Accordingly, the electronic device 100 may display the beam image 200 outputted from the display 720 over a fixed, corresponding location (e.g., palm 11) even if the electronic device 100 moves or shakes. Additionally, the posture controller 750 may change the posture of the display 720 such that the beam image 200 generated from the display 720 is directed at the user's palm 11 and fingers 12.

The driver 760 may include a motor to drive the posture controller 750. The driver 760 may be configured to rotate the gimbals using a piezoelectric element.

The battery 771 may provide power to at least one component of the electronic device 100. According to one or more embodiments, the battery 771 may include, for example, a non-rechargeable primary cell, and a rechargeable secondary cell or a fuel cell.

The power manager 772 may manage the power supplied to the electronic device 100. According to one or more embodiments, the power manager 772 may be implemented as at least a part of a power management integrated circuit (PMIC), for example.

The input module 773 may receive commands or data to be used by the components (e.g., processor 710) of the electronic device 100 from the outside (e.g., user) of the electronic device 100. The input module 773 may include, for example, a microphone or a key (e.g., physical button).

The camera 774 may capture still images and moving images. According to one or more embodiments, the camera 774 may include one or more lenses 341, image sensors, image signal processors 710, or flashes.

The communicator 775 may support establishing a direct (e.g., wired) communication channel or a wireless communication channel between the electronic device 100 and an external electronic device (e.g., electronic device 100 or server), and performing communication through the established communication channel. The communicator 775 may include one or more communication processors 710 that operate independently of the processor 710 (e.g., application processor 710), and support direct (e.g., wired) communication or wireless communication. According to one or more embodiments, the communicator 775 may include a wireless communicator (e.g., cellular communicator, short range wireless communicator, or global navigation satellite system (GNSS) communicator) or a wired communicator (e.g., local area network (LAN) communicator or power line communicator). A corresponding module of these communicators 775 may communicate with the external electronic device 100 via a first network (e.g., short range communication network, such as Bluetooth® (Bluetooth® being a registered trademark of Bluetooth Sig, Inc., Kirkland, WA), Wi-Fi-Direct® (Wi-Fi® and Wi-Fi-Direct® being registered trademarks of the non-profit Wi-Fi Alliance), or infrared data association (IrDA)) or a second network (e.g., long range communication network, such as a legacy cellular network, a 5G network, a next generation communication network, the Internet, or a computer network (e.g., LAN or WAN)). The communicators 775 may be integrated as a single component (e.g., single chip), or may be implemented as a plurality of separate components (e.g., multiple chips). The wireless communicator 775 may use subscriber information (e.g., international mobile subscriber identifier (IMSI)) stored in a subscriber identifier/subscriber identification module to verify or authenticate the electronic device 100 within a communication network, such as the first network or the second network.

The wireless communicator 775 may support a 5G network beyond a 4G network and next-generation communication technology, such as new radio access technology (NR access technology). The NR access technology may support high-speed transmission of high-capacity data (enhanced mobile broadband (eMBB)), minimal terminal power and connectivity of multiple terminals (massive machine type communications (mMTC)), or ultra-reliable and low-latency communications (URLLC). The wireless communicator 775 may support a high frequency band (e.g., mmWave band), for example, to achieve high data transmission rates. The wireless communicator 775 may support various techniques, such as beamforming, massive multiple-input and multiple-output (massive MIMO), full dimensional MIMO (FD-MIMO), array antennas, analog beamforming, or large scale antennas, for achieving performance in a high frequency band.

The antenna 776 may transmit or receive signals or power to or from the outside (e.g., external electronic device 100). According to one or more embodiments, the antenna 776 may include an antenna having a radiator formed of a conductive pattern or a conductor formed on a substrate (e.g., PCB). According to one or more embodiments, the antenna 776 may include a plurality of antennas (e.g., array antenna). In this case, at least one antenna suitable for a communication method used in a communication network, such as the first network or the second network, may be selected from the plurality of antennas by the communicator 775. The signals or power may be transmitted or received between the communicator 775 and the external electronic device 100 through the selected at least one antenna. According to some embodiments, in addition to the radiator, other components (e.g., radio frequency integrated circuit (RFIC)) may be additionally formed as a part of the antenna 776.

The antenna 776 may form an mmWave antenna 776. According to one or more embodiments, the mmWave antenna 776 may include a printed circuit board, an RFIC located on or adjacent to a first surface (e.g., bottom surface) of the printed circuit board and capable of supporting a corresponding high frequency band (e.g., mmWave band), and a plurality of antennas (e.g., array antenna) located on or adjacent to a second surface (e.g., top surface or side surface) of the printed circuit board and capable of transmitting or receiving signals in the corresponding high frequency band.

The output module 777 may include a sound output module and an LED indicator. The sound output module may output a sound signal to the outside of the electronic device 100. The sound output module may include, for example, a speaker or a receiver. The speaker may be used for general purposes, such as playing multimedia or playing recordings. The receiver may be used to receive incoming calls. The sound output module may convert sound into electrical signals or vice versa. According to one or more embodiments, the sound output module may acquire sound from an external source or may output sound through an external electronic device (e.g., electronic device 100, such as a speaker or headphones) that is directly or wirelessly connected to the electronic device 100.

FIG. 8 is a perspective view illustrating the posture controller 750 located in a housing. The posture controller 750 of FIG. 8 may be the posture controller 750 described with reference to FIG. 7.

Referring to FIG. 8, the posture controller 750 includes a first gimbal 810, a second gimbal 820, and a third gimbal 830 as a three-axis gimbal. Each of the first, second, and third gimbals 810, 820, and 830 has a ring shape, and is located outside the display 720. That is, in one or more embodiments, the display 720 may be located in a space 800 corresponding to the interior of the first to third gimbals 810, 820, and 830. The display 720 may be rotationally moved about the lateral axis, the longitudinal axis, and the vertical axis by being connected to the first to third gimbals 810, 820, and 830.

The first gimbal 810 rotates the display 720 about a first axis. The first axis may be, for example, the lateral axis. The first gimbal 810 may change the posture of the display 720 to make pitch rotation, which is rotation about the lateral axis.

The second gimbal 820 rotates the display 720 about a second axis perpendicular to the first axis. The second axis may be, for example, the longitudinal axis. The second gimbal 820 may change the posture of the display 720 to make roll rotation, which is rotation about the longitudinal axis.

The third gimbal 830 rotates the display 720 about a third axis perpendicular to the first and second axes. The third axis may be, for example, the vertical axis. The third gimbal 830 may change the posture of the display 720 to make yaw rotation, which is rotation about the vertical axis.

Each of the first to third gimbals 810, 820, and 830 is configured to be rotationally moved by the driver 760. The driver 760 may include a ring-type ultrasonic motor. The motor utilizes a piezoelectric element to rotate the gimbals. Hereinafter, the driver 760 will be described in more detail with reference to FIGS. 9 and 10.

Figure 9:
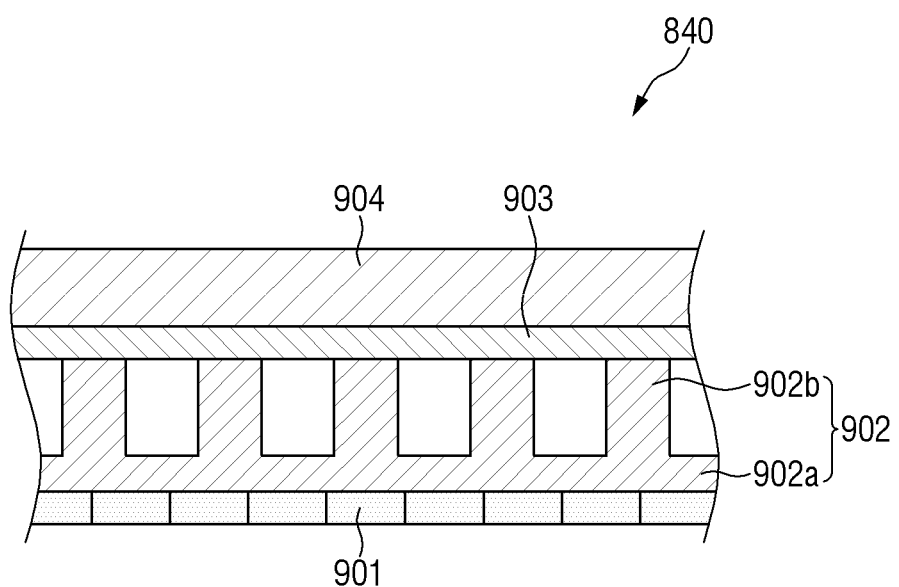
FIGS. 9 and 10 are conceptual diagrams illustrating a driver of an electronic device according to one or more embodiments.
Figure 10:
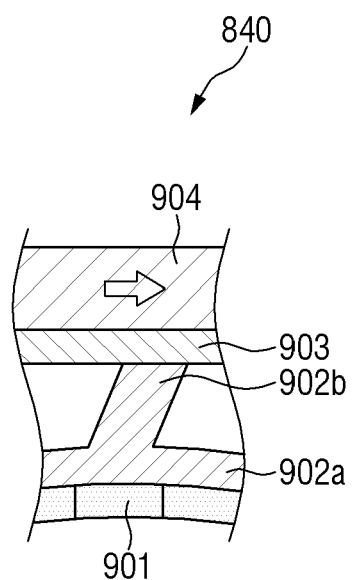

FIGS. 9 and 10 are conceptual diagrams illustrating a driver 760 of an electronic device 100 according to one or more embodiments. The driver 760 of FIGS. 9 and 10 may be the driver 760 described with reference to FIG. 7. FIG. 9 illustrates a non-driven state of the driver 760, and FIG. 10 illustrates a driven state of the driver 760.

The driver 760 includes a plurality of driving motors 840 for independently rotating the plurality of gimbals. For example, the driver 760 may include a first driving motor 841 to drive the first gimbal 810, a second driving motor 842 to drive the second gimbal 820, and a third driving motor 843 to drive the third gimbal 830. FIGS. 9 and 10 illustrate any one of the first to third driving motors 841, 842, or 843. Accordingly, the descriptions with reference to FIGS. 9 and 10 may be features that the first to third driving motors 841, 842, and 843 each include.

The driving motor 840 may be a ring-shaped ultrasonic motor. The driving motor 840 includes an annular piezoelectric element 901, a fixing portion 902 that is in contact with the piezoelectric element 901 and includes a plurality of protrusions 902b, and a disk-shaped rotating portion 904 that is in contact with the fixing portion 902. Between the fixing portion 902 and the rotating portion 904, a friction ring 903 may be further in contact with the protrusions 902b. The fixing portion 902 may be referred to as a "master ring" and the rotating portion 904 may be referred to as a "slave ring".

Referring to FIGS. 9 and 10, the piezoelectric element 901 is an element having the property of twisting when electricity is applied. For example, the piezoelectric element 901 may twist in response to a frequency corresponding to ultrasonic waves. The piezoelectric element 901 generates a traveling wave based on the shape of a sine wave of electricity applied to the piezoelectric element 901. The traveling wave having a sine wave causes some of the protrusions 902b of the fixing portion 902 to move in an upward or downward direction, and the movement of these protrusions 902b generates a frictional force in a rotational direction to rotate the rotating portion 904. When the shape of the sine wave of electricity applied to the piezoelectric element 901 changes, the rotational direction of the driving motor may change.

The fixing portion 902 is a member in contact with the piezoelectric element 901 and is fixed without rotation. The fixing portion 902 includes a base portion 902a, and the plurality of protrusions 902b protruding from the base portion 902a toward the rotating portion 904. The traveling wave generated by the piezoelectric element 901 is transmitted to the protrusions 902b of the fixing portion 902, and some of the protrusions 902b move in the upward or downward direction based on the traveling wave. When some of the protrusions 902b move in the upward or downward direction, the friction ring 903 forms a frictional force in a rotational direction perpendicular to the upward or downward direction (horizontal direction in FIGS. 9 and 10). The frictional force generated by the friction ring 903 rotates the rotating portion 904. That is, the friction ring 903 and the rotating portion 904 coupled thereto are displaced in the rotational direction by the movement and deformation of the protrusions 902b, and the driving motors 840 of the driver 760 rotate accordingly.

Figure 11:
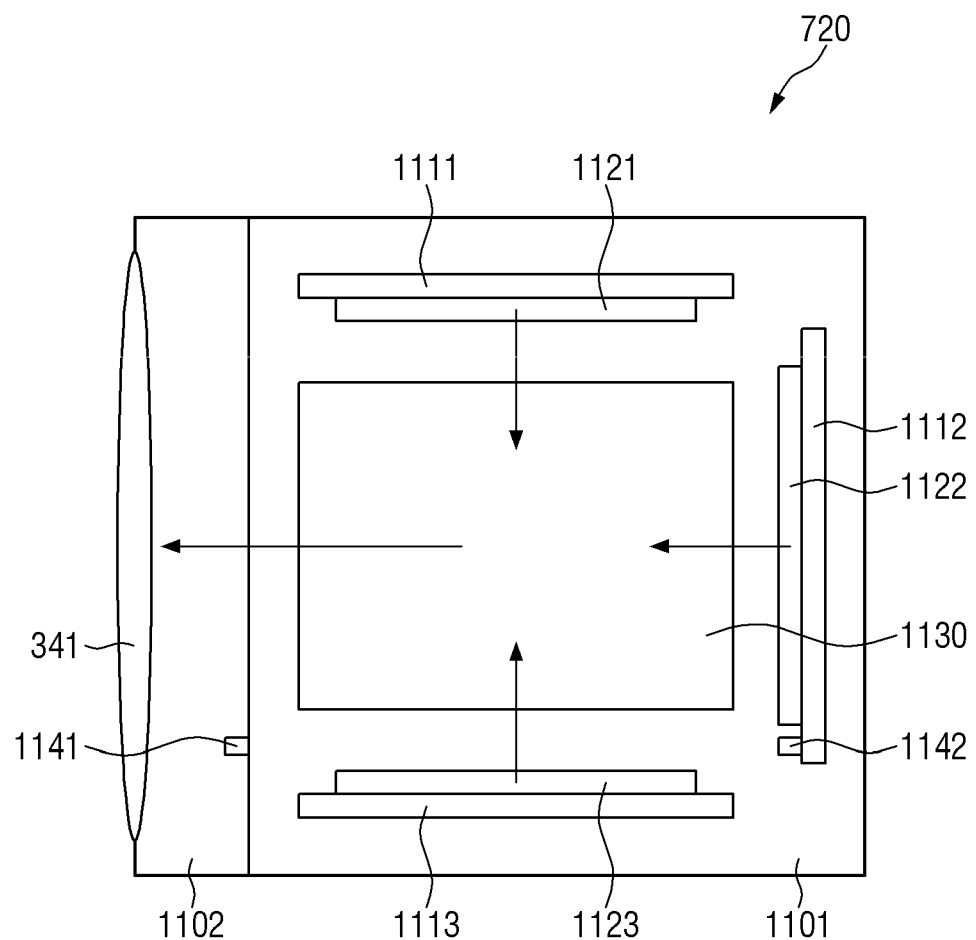
FIG. 11 is a block diagram of a display device according to one or more embodiments.

FIG. 11 is a block diagram of a display device according to one or more embodiments. The display device of FIG. 11 may include the display 720 described with reference to FIG. 7.

Referring to FIG. 11, the display device (e.g., the display 720) includes a display portion 1101 including the display panel 1120, and a lens portion 1102 including the lens 341. The display portion 1101 and the lens portion 1102 may be located adjacent to each other. In FIG. 11, for simplicity of description, the display 720 is physically divided into the display portion 1101 and the lens portion 1102, but the display portion 1101 and the lens portion 1102 may be substantially indistinguishable, and may be a single combined, or integral, component.

The display portion 1101 may include at least one display panel 1120, and a substrate 1110 (e.g., PCB) on which the display panel 1120 is mounted. The display panel 1120 may be a single display panel 1120 that emits display light in a combination of red light, green light, and blue light. Alternatively, as shown in the drawing, the display panel 1120 may include a first display panel 1121 for emitting red light, a second display panel 1122 for emitting green light, and a third display panel 1123 for emitting blue light. In FIG. 11, there is shown a first substrate 1111 on which the first display panel 1121 is mounted, a second substrate 1112 on which the second display panel 1122 is mounted, and a third substrate 1113 on which the third display panel 1123 is mounted. In FIG. 11, the arrangement of the first to third substrates 1111, 1112, and 1113 and the first to third display panels 1121, 1122, and 1123 is merely an example, and the present disclosure is not limited thereto.

The display portion 1101 includes a prismatic portion 1130 that receives display light from at least one display panel 1120, refracts the received display light, and transmits it to the lens 341. The prismatic portion 1130 may be a trichroic prism that transmits light emitted from each of the first to third display panels 1121, 1122, and 1123 to the lens 341. The prismatic portion 1130 may include a reflective optical element, such as a beam splitter. Alternatively, the prismatic portion 1130 may include a diffractive optical element, such as a diffraction optical element (DOE) or a holographic optical element (HOE), which includes a grating having a diffractive function.

The lens portion 1102 includes the lens 341 that receives display light from the prismatic portion 1130 of the display portion 1101. At least a part of the lens 341 is exposed to the outside through a part of the main body 310 of the electronic device 100. In one or more embodiments, at least one shift motor for shifting the lens 341 may be located around the lens 341. The shift motor serves to adjust alignment between the lens 341 and the display portion 1101 by shifting the lens 341. The lens portion 1102 may include a reflective member 1141 to check the alignment between the lens portion 1102 and the display portion 1101. The display portion 1101 may include an optical sensor 1142 that receives light reflected by the reflective member 1141 of the lens portion 1102, and the processor 710 of the electronic device 100 may adjust the alignment between the lens portion 1102 and the display portion 1101 based on the light sensed by the optical sensor 1142. That is, the processor 710 may control the shift motor to align the lens portion 1102 with the display portion 1101 based on the light sensed by the optical sensor 1142.

Figure 12A:
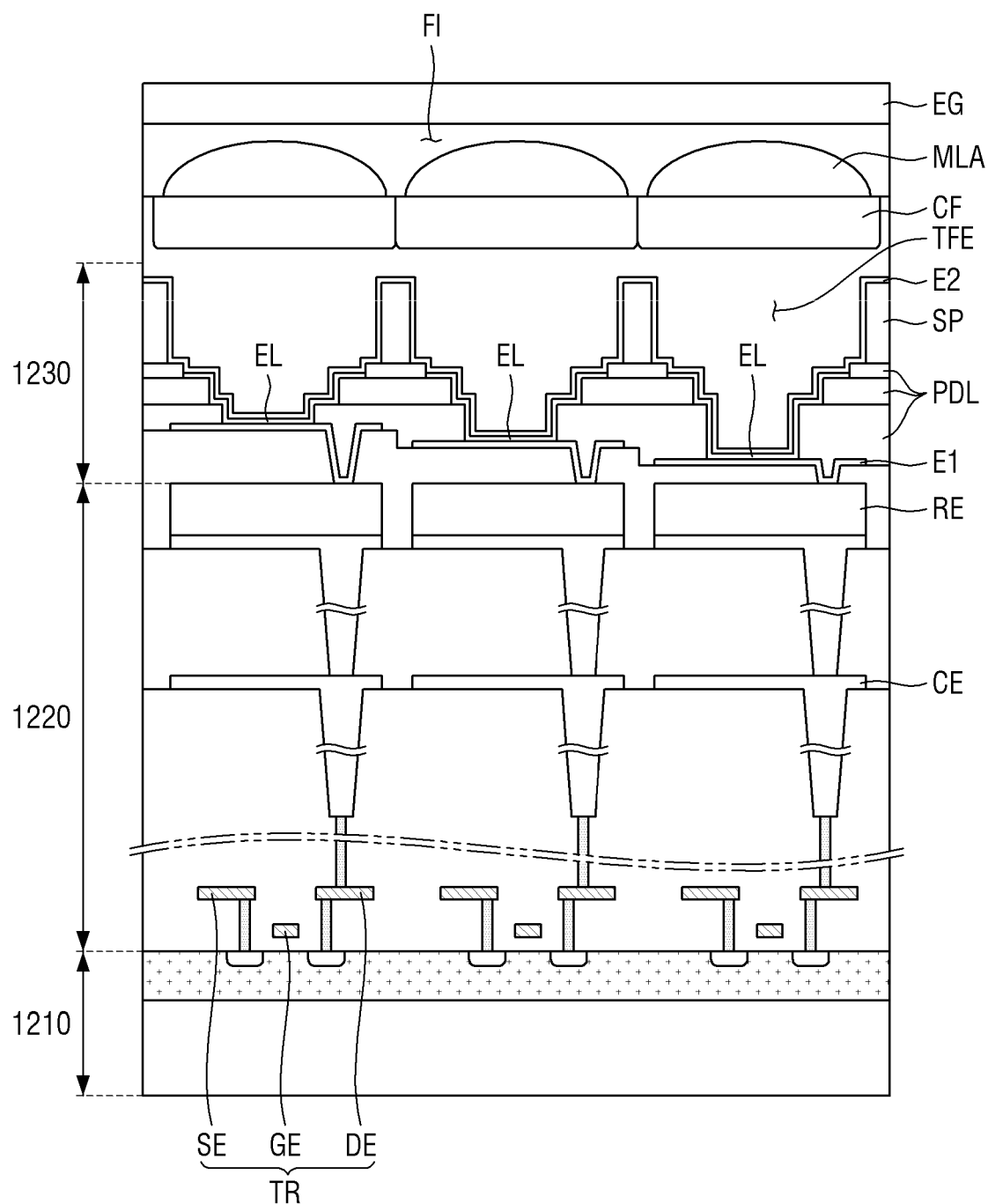
FIG. 12A is a schematic cross-sectional view of a display panel according to one or more embodiments.

FIG. 12A is a schematic cross-sectional view of the display panel 1120 according to one or more embodiments. The display panel 1120 of FIG. 12A may be the display panel 1120 described with reference to FIG. 11. For example, FIG. 12A is a cross-sectional view of a part of an emission area of the display panel 1120 according to one or more embodiments.

Referring to FIG. 12A, the display panel 1120 may include a semiconductor wafer substrate 1210, a circuit layer 1220 including transistors located on the semiconductor wafer substrate 1210, and an OLED layer (e.g., a light-emitting element layer) 1230 located on the circuit layer 1220. An encapsulation layer TFE may be formed on the OLED layer 1230, and a color filter CF and a refractive layer MLA may be located on the encapsulation layer TFE. An encapsulation substrate EG may be located on the uppermost layer of the display panel 1120, and a filler FI may be filled between the encapsulation substrate EG and the refractive layer MLA.

The semiconductor wafer substrate 1210 may include a silicon substrate. For example, the semiconductor wafer substrate 1210 may have a semiconductor pattern formed on a silicon substrate. The semiconductor wafer substrate 1210 may include any one of a monocrystalline silicon wafer, a polycrystalline silicon wafer, and/or an amorphous silicon wafer.

The circuit layer 1220 including transistors TR may be located on the semiconductor wafer substrate 1210. The transistor TR may include a gate electrode GE, a source electrode SE, and a drain electrode DE. The transistor TR may be configured to control pixels located in the display area of the display panel 1120, for example, a red pixel, a green pixel, or a blue pixel. When the display panel 1120 is the first display panel 1121 configured to emit red light, the first display panel 1121 may include a red pixel that emits red light. When the display panel 1120 is the second display panel 1122 configured to emit green light, the second display panel 1122 may include a green pixel that emits green light. When the display panel 1120 is the third display panel 1123 configured to emit blue light, the third display panel 1123 may include a blue pixel that emits blue light. When the display panel 1120 is the single display panel that emits display light by combining red light, green light, and blue light, the display panel may include red pixels, green pixels, and blue pixels.

At least one connection electrode CE electrically connected to the transistor TR, along with conductive wires, may be further located on the transistor TR. For example, the transistor TR located on the semiconductor wafer substrate 1210 may be electrically connected to at least one connection electrode CE through at least one contact hole, and the connection electrode CE may be electrically connected to the OLED layer 1230.

Meanwhile, a reflective electrode RE for reflecting light emitted from the OLED layer 1230 is located between the OLED layer 1230 and the connection electrode CE. The reflective electrode RE may be electrically connected to a first electrode E1 of the OLED layer 1230, for example, an anode electrode, through a contact hole. Accordingly, the transistor RE may be electrically connected to the first electrode E1 of the OLED layer 1230, for example, the anode electrode, via at least one connection electrode CE and the reflective electrode RE.

The OLED layer 1230 including the first electrode E1, a light-emitting layer EL, and a second electrode E2 is located on the circuit layer 1220. A pixel-defining layer PDL for partitioning pixels is located on the OLED layer 1230. A spacer SP may be located on the pixel-defining layer PDL. The spacer SP may be referred to as a barrier or a separator. The spacer SP may serve to increase front emission efficiency by reflecting incident light such that the light emitted from the light-emitting layer EL is directed in a normal direction of the display panel 1120. The pixel-defining layer PDL and the spacer SP may be formed of an organic layer, such as acryl resin, epoxy resin, phenolic resin, polyamide resin, polyimide resin and/or the like.

The first electrodes E1 may be electrically connected to the transistor TR through the connection electrode CE of the semiconductor wafer substrate 1210 and at least one contact hole connected thereto. The first electrodes E1 may be anode electrodes for driving the light-emitting layer EL. The first electrodes E1 may be reflective electrodes. For example, the first electrodes E1 may reflect light emitted from the light-emitting layer EL in a downward direction. The first electrodes E1 may include a metal material having high light reflectivity. For example, the first electrodes E1 may include any one of Al, Al/Cu, and/or Al/TiN.

The light-emitting layer EL may be located on the first electrodes E1. The light-emitting layer EL may include a single layer or a plurality of stacked structures. The light-emitting layer EL may be configured to emit white light. For example, the white light may be a mixture of blue light, green light, and red light. Alternatively, the white light may be a mixture of blue light and yellow light. According to one or more other embodiments, the light-emitting layer EL may be configured to emit color light instead of white light. However, hereinafter, for simplicity of description, it will be described that the light-emitting layer EL emits white light.

The second electrode E2 may be located on the light-emitting layer EL. The second electrode E2 may be a common electrode and may be, for example, a cathode electrode. The second electrode E2 may be a transmissive or semi-transmissive electrode. For example, the second electrode E2 may transmit light emitted from the light-emitting layer EL. The second electrode E2 may include a conductive material. For example, the second electrode E2 may include Li, Ca, LiF/Ca, LiF/Al, Al, Mg, BaF, Ba, Ag, Au, and Cu having a low work function, or a compound or mixture thereof.

A thin-film encapsulation layer TFE may be located on the OLED layer 1230. The encapsulation layer TFE may be configured to encapsulate the light-emitting layer EL to reduce or prevent permeation of oxygen or moisture into the light-emitting layer EL. The encapsulation layer TFE may be located on the top surface and side surfaces of the light-emitting layer EL. The encapsulation layer TFE may include at least one inorganic layer to reduce or prevent oxygen or moisture from permeating into the light-emitting layer EL. In addition, the encapsulation layer TFE may include at least one organic layer to protect the light-emitting layer EL from foreign substances, such as dust. The inorganic layer of the encapsulation layer TFE may be formed of multiple layers in which one or more inorganic layers of a silicon nitride layer, a silicon oxynitride layer, a silicon oxide layer, a titanium oxide layer, and/or an aluminum oxide layer are alternately stacked. The organic layer of the encapsulation layer TFE may be an organic layer, such as acryl resin, epoxy resin, phenolic resin, polyamide resin, polyimide resin or the like.

The color filter CF and the refractive layer MLA may be located on the encapsulation layer TFE. The color filter includes a red color filter that transmits red light, a green color filter that transmits green light, and a blue color filter that transmits blue light. The first display panel 1121 may include a red color filter. The second display panel 1122 may include a green color filter. The third display panel 1123 may include a blue color filter. When the display panel 1120 is the single display panel 1120 that emits display light by combining red light, green light, and blue light, the display panel 1120 may include a red color filter, a green color filter, and a blue color filter.

An encapsulation substrate EG may be located on the color filter CF. The encapsulation substrate EG may be attached on the color filter CF by a transparent adhesive member, such as an optically clear adhesive (OCA) film.

The refractive layer MLA may be located between the color filter CF and the encapsulation substrate EG to increase the front emission efficiency of the display panel 1120. The refractive layer MLA may be designed to have the shape of the lens 341 and may refract incident light such that light emitted from the light-emitting layer is directed in a normal direction of the display panel 1120. Such a refractive layer MLA may be referred to as a light control pattern.

Figure 12B:
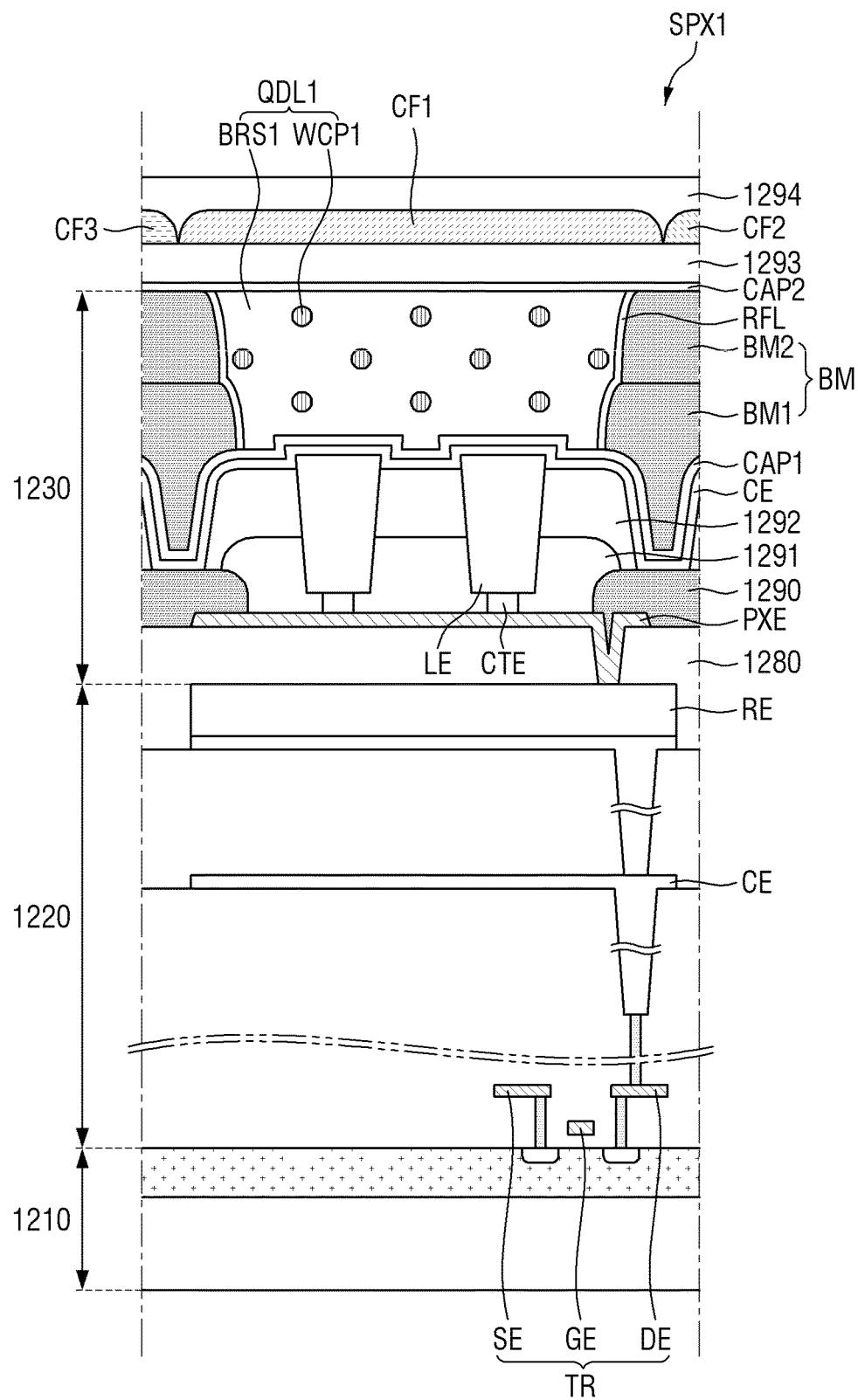
FIG. 12B is a schematic cross-sectional view of a display panel according to one or more other embodiments.

FIG. 12B is a schematic cross-sectional view of the display panel 1120 according to one or more embodiments. The display panel 1120 of FIG. 12B may be the display panel 1120 described with reference to FIG. 11. For example, FIG. 12B is a cross-sectional view of a part of an emission area of the display panel 1120 according to one or more embodiments.

Referring to FIG. 12B, the display panel 1120 may include the semiconductor wafer substrate 1210, the circuit layer 1220 including transistors located on the semiconductor wafer substrate 1210, and the OLED layer 1230 located on the circuit layer 1220.

The semiconductor wafer substrate 1210 may include a silicon substrate. For example, the semiconductor wafer substrate 1210 may have a semiconductor pattern formed on a silicon substrate. The semiconductor wafer substrate 1210 may include any one of a monocrystalline silicon wafer, a polycrystalline silicon wafer, and/or an amorphous silicon wafer.

The circuit layer 1220 including the transistors TR may be located on the semiconductor wafer substrate 1210. The transistor TR may include the gate electrode GE, the source electrode SE, and the drain electrode DE. The transistor TR may be configured to control pixels located in the display area of the display panel 1120, for example, a red pixel, a green pixel, or a blue pixel. When the display panel 1120 is the first display panel 1121 configured to emit red light, the first display panel 1121 may include a red pixel (the first sub-pixel) that emits red light. When the display panel 1120 is the second display panel 1122 configured to emit green light, the second display panel 1122 may include a green pixel (the second sub-pixel) that emits green light. When the display panel 1120 is the third display panel 1123 configured to emit blue light, the third display panel 1123 may include a blue pixel (the third sub-pixel) that emits blue light. When the display panel 1120 is the single display panel 1120 that emits display light by combining red light, green light, and blue light, the display panel may include red pixels, green pixels, and blue pixels.

At least one connection electrode CE electrically connected to the transistor TR and conductive wires may be further located on the transistor TR. For example, the transistor TR located on the semiconductor wafer substrate 1210 may be electrically connected to at least one connection electrode CE through at least one contact hole, and the connection electrode CE may be electrically connected to the OLED layer 1230.

Meanwhile, the reflective electrode RE for reflecting light emitted from the OLED layer 1230 is located between the OLED layer 1230 and the connection electrode CE.

A first planarization layer 1280 may be located on the reflective electrode RE. The first planarization layer 1280 may be formed of an organic layer, such as acryl resin, epoxy resin, phenolic resin, polyamide resin, polyimide resin, and/or the like.

The OLED layer 1230 may be located on the first planarization layer 1280. The OLED layer 1230 may include pixel electrodes PXE, light-emitting elements LE, the common electrode CE, and a second planarization layer/bank 1290.

The pixel electrodes PXE may be located on a first planarization layer 1280. Each of the pixel electrodes PXE is connected to the reflective electrode RE through a pixel connection hole penetrating the first planarization layer 1280. Accordingly, the pixel electrodes PXE may be electrically connected to the connection electrode CE of the semiconductor wafer substrate 1210 and the transistor TR connected thereto. A pixel voltage or an anode voltage controlled by the transistor TR may be applied to the pixel electrode PXE.

The pixel electrodes PXE may be formed as a single layer or multiple layers made of any one of molybdenum (Mo), aluminum (Al), chromium (Cr), gold (Au), titanium (Ti), nickel (Ni), neodymium (Nd), and/or copper (Cu), and/or an alloy thereof. Because the pixel electrodes PXE serve to bond with the light-emitting element LE, it is desirable to lower the contact resistance. For example, the pixel electrodes PXE may be made of copper (Cu) having low sheet resistance.

A bank 1290 may be located to cover an edge of the pixel electrode PXE. The bank 1290 may be formed of an organic layer, such as acryl resin, epoxy resin, phenolic resin, polyamide resin, polyimide resin and/or the like. The bank 1290 may include a light-blocking material to reduce or prevent light from the light-emitting element LE of one sub-pixel from traveling to a sub-pixel adjacent thereto. For example, the bank 1290 may contain an organic block pigment or an inorganic black pigment, such as carbon black or the like.

The plurality of light-emitting elements LE may be located on the exposed pixel electrode PXE that is not covered by the bank 1290. The illustrated example illustrates that each of the plurality of light-emitting elements LE is a vertical micro LED. Each of the plurality of light-emitting elements LE may have a cross-sectional shape of a reverse taper. That is, each of the plurality of light-emitting elements LE may have a trapezoidal cross-sectional shape in which the width of the top surface is wider than the width of the bottom surface.

Each of the plurality of light-emitting elements LE may be formed of an inorganic material, such as GaN. In each of the plurality of light-emitting elements LE, a length in the first direction (e.g., the length direction), a length in the second direction (e.g., the width direction), and a length in the third direction (e.g., the height direction) may be several to several hundred μm, respectively. For example, each of the plurality of light-emitting elements LE may have a length of about 100 µm or less in each of the first and second directions.

Each of the light-emitting elements LE may be formed by growing on a semiconductor substrate, such as a silicon wafer. Each of the plurality of light-emitting elements LE may be directly transferred from the semiconductor substrate onto the pixel electrode PXE of the substrate SUB. Alternatively, each of the plurality of light-emitting elements LE may be transferred onto the pixel electrodes PXE of the substrate SUB through an electrostatic method using an electrostatic head, or a stamping method using an elastic polymer material, such as PDMS or silicon, as a transfer substrate.

A contact electrode CTE may be located on the pixel electrode PXE. The contact electrode CTE and the pixel electrode PXE may be fusion-bonded by heat and pressure. Alternatively, the contact electrode CTE and the pixel electrode PXE may be bonded to each other through a conductive adhesive member, such as an anisotropic conductive film (ACF) or an anisotropic conductive paste (ACP). Alternatively, the contact electrode CTE and the pixel electrode PXE may be bonded to each other through a soldering process. For example, the contact electrode CTE may include at least one of gold (Au), copper (Cu), aluminum (Al), and/or tin (Sn).

Each of the plurality of light-emitting elements LE may include a first semiconductor layer, an electron-blocking layer, an active layer, a superlattice layer, and a second semiconductor layer.

The first semiconductor layer may be located on the contact electrode CTE. The first semiconductor layer may be formed of GaN doped with a first conductivity type dopant, such as Mg, Zn, Ca, Se, or Ba.

The electron-blocking layer may be located on the first semiconductor layer. The electron-blocking layer may be a layer for suppressing or preventing too many electrons from flowing into the active layer MQW. For example, the electron-blocking layer may be AlGaN or p-AlGaN doped with p-type Mg. The electron-blocking layer may be omitted.

The active layer may be located on the electron-blocking layer. The active layer may emit light by coupling of electron-hole pairs according to an electrical signal applied through the first semiconductor layer and the second semiconductor layer.

The active layer may include a material having a single or multiple quantum well structure. When the active layer contains a material having a multiple quantum well structure, the active layer may have the structure in which a plurality of well layers and barrier layers are alternately laminated. At this time, the well layer may be formed of InGaN, and the barrier layer may be formed of GaN or AlGaN, but the present disclosure is not limited thereto. Alternatively, the active layer MQW may have a structure in which semiconductor materials having large band gap energy and semiconductor materials having small band gap energy are alternately stacked, and may include other group III to V semiconductor materials according to the wavelength band of the emitted light.

When the active layer includes InGaN, the color of emitted light may vary depending on the content of indium (In). For example, as the content of indium (In) increases, the wavelength band of the light emitted by the active layer may shift to the red wavelength band, and as the content of indium (In) decreases, the wavelength band of the light emitted by the active layer may shift to the blue wavelength band. For example, the content of indium (In) in the active layer MQW of the light-emitting element LE emitting light in a blue wavelength band may be about 10 wt % to about 20 wt %.

The superlattice layer may be located on the active layer. The superlattice layer may be a layer for relieving stress between the second semiconductor layer SEM2 and the active layer MQW. For example, the superlattice layer may be formed of InGaN or GaN. The superlattice layer SLT may be omitted.

The second semiconductor layer may be located on the superlattice layer. The second semiconductor layer may be doped with a second conductive dopant, such as Si, Ge, Sn, or the like. For example, the second semiconductor layer may be n-GaN doped with n-type Si.

A first organic layer 1291 may be located on the pixel electrode PXE not covered by the bank 1290 and the plurality of light-emitting elements LE. The first organic layer 1291 may be located to cover a part of the side surface and top surface of the bank 1290. A height of the first organic layer 1291 may be greater than a height of the bank 1290. The first organic layer 1291 may be located on a part of a side surface of each of the plurality of light-emitting elements LE. The height of the first organic layer 1291 may be smaller than the height of each of the plurality of light-emitting elements LE. The first organic layer 1291 may be formed of an organic layer, such as acryl resin, epoxy resin, phenolic resin, polyamide resin, polyimide resin and/or the like.

A second organic layer 1292 may be located on the first organic layer 1291. The second organic layer 1292 may be located on a part of a side surface of each of the plurality of light-emitting elements LE. A sum of the height of the first organic layer 1291 and the height of the second organic layer 1292 may be smaller than the height of each of the plurality of light-emitting elements LE. The second organic layer 1292 may be formed of an organic layer, such as acryl resin, epoxy resin, phenolic resin, polyamide resin, polyimide resin and/or the like.

The first organic layer 1291 and the second organic layer 1292 are layers for flattening a stepped portion caused by the plurality of light-emitting elements LE. When the height of each of the plurality of light-emitting elements LE is similar to the height of the first organic layer 1291, the second organic layer 1292 may be omitted.

The common electrode CE may be located on a top surface of each of the plurality of light-emitting elements LE and a top surface of the second organic layer 1292. The common electrode CE may be located on the exposed bank 1290 without being covered by the first organic layer 1291 and the second organic layer 1292. The common electrode CE may be a common layer commonly formed in a first sub-pixel SPX1, a second sub-pixel, and a third sub-pixel. The common electrode CE may be made of a transparent conductive material (TCO), such as indium tin oxide (ITO) or indium zinc oxide (IZO), that can transmit light.

Meanwhile, the pixel electrode PXE may be referred to as an anode electrode, and the common electrode CE may be referred to as a cathode electrode.

A first capping layer CAP1 may be located on the common electrode CE. The first capping layer CAP1 may be formed of an inorganic layer, for example, a silicon nitride layer, a silicon oxynitride layer, a silicon oxide layer, a titanium oxide layer, or an aluminum oxide layer.

A light-blocking layer BM, a light conversion layer QDL1, and a light-transmitting layer may be located on the first capping layer CAP1. The light conversion layer QDL1 and the light-transmitting layer may be formed by partitioning the light-blocking layer BM. For example, in the first sub-pixel SPX1, a first light conversion layer, which converts a part of light in a blue wavelength band incident from the light-emitting element LE into light in a red wavelength band, is located on the first capping layer CAP1. In the second sub-pixel, a second light conversion layer, which converts a part of light in a blue wavelength band incident from the light-emitting element LE into light in a green wavelength band, is located on the first capping layer CAP1. In the third sub-pixel, a light-transmitting layer that transmits light in a blue wavelength band incident from the light-emitting element LE may be located on the first capping layer CAP1.

The light-blocking layer BM may overlap the bank 1290, and may not overlap the plurality of light-emitting elements LE.

The illustrated example illustrates a cross-sectional structure of at least a part of the first sub-pixel SPX1 among the first to third sub-pixels. Accordingly, the light conversion layer QDL1 illustrated in FIG. 12B is the first light conversion layer QDL1 that converts a part of light in a blue wavelength band incident from the light-emitting element LE into light in a red wavelength band. The first light conversion layer QDL1 may include a first base resin BRS1 and a first wavelength conversion particle WCP1. The first base resin BRS1 may include a light-transmissive organic material. For example, the first base resin BRS1 may contain epoxy resin, acrylic resin, cardo resin, or imide resin. The first wavelength conversion particle WCP1 may convert a part of light, which is in a blue wavelength band and is incident from the light-emitting element LE, into light in a red wavelength band. The first wavelength conversion particle WCP1 may be a quantum dot (QD), a quantum rod, a fluorescent material, or a phosphorescent material.

Meanwhile, in one or more embodiments, the second light conversion layer located on the second sub-pixel may include a second base resin and a second wavelength conversion particle. The second base resin may contain a light-transmissive organic material. For example, the second base resin may contain epoxy resin, acrylic resin, cardo resin, or imide resin. The second wavelength conversion particle may convert a part of light, which is in a blue wavelength band and is incident from the light-emitting element LE, into light in a green wavelength band. The second wavelength conversion particle may be a quantum dot (QD), a quantum rod, a fluorescent material, or a phosphorescent material.

The light-transmitting layer may include a light-transmissive organic material. For example, the light-transmitting layer may include epoxy resin, acrylic resin, cardo resin, imide resin, or the like.

The light-blocking layer BM may include a first light-blocking layer BM1 and a second light-blocking layer BM2 sequentially stacked. The length of the first light-blocking layer BM1 in the first direction DR1 or the length of the first light-blocking layer BM1 in the second direction DR2 may be longer than the length of the second light-blocking layer BM2 in the first direction DR1 or the length of the second light-blocking layer BM2 in the second direction DR2. The first light-blocking layer BM1 and the second light-blocking layer BM2 may be formed of an organic layer, such as acryl resin, epoxy resin, phenolic resin, polyamide resin, polyimide resin and/or the like. The first light-blocking layer BM1 and the second light-blocking layer BM2 may include a light-blocking material to reduce or prevent light from the light-emitting element LE of one sub-pixel from traveling to a sub-pixel adjacent thereto. For example, the first light-blocking layer BM1 and the second light-blocking layer BM2 may contain an organic black pigment or an inorganic black pigment, such as carbon black or the like.

The reflective layer RFL may be located between the light-blocking layer BM and the first light conversion layer QDL1, between the light-blocking layer BM and the second light conversion layer, and between the light-blocking layer BM and the light-transmitting layer. The reflection layer RFL may include a metal material having high reflectivity, such as aluminum (Al). The thickness of the reflection layer RFL may be about 0.1 μm.

A second capping layer CAP2 may be located on the light-blocking layer BM, the light conversion layer QDL1, the second light conversion layer, and the light-transmitting layer. The second capping layer CAP2 may be formed of an inorganic layer, for example, a silicon nitride layer, a silicon oxynitride layer, a silicon oxide layer, a titanium oxide layer, or an aluminum oxide layer. The light-blocking layer BM, the light conversion layer QDL1, the second light conversion layer, and the light-transmitting layer may be encapsulated by the first capping layer CAP1 and the second capping layer CAP2.

A third organic layer 1293 may be located on the second capping layer CAP2. The third organic layer 1293 may be formed of acryl resin, epoxy resin, phenolic resin, polyamide resin, polyimide resin or the like.

A plurality of color filters CF1, CF2, and CF3 may be located on the third organic layer 1293. The plurality of color filters CF1, CF2 and CF3 may include first color filters CF1, second color filters CF2, and third color filters CF3.

Each of the first color filters CF1 located on the first sub-pixel SPX1 may transmit light in a red wavelength band, and may absorb or block light in a blue wavelength band. Therefore, each of the first color filters CF1 may transmit light in a red wavelength band converted by the light conversion layer QDL1 among the lights of the blue wavelength band emitted from the light-emitting element LE, and may absorb or block light in a blue wavelength band that is not converted by the light conversion layer QDL1. Accordingly, the first sub-pixel SPX1 may emit light in a red wavelength band.

Each of the second color filters CF2 located in the second sub-pixel may transmit light in a green wavelength band, and may absorb or block light in a blue wavelength band. Therefore, each of the second color filters CF2 may transmit light in a green wavelength band converted by the light conversion layer QDL1 among the lights of the blue wavelength band emitted from the light-emitting element LE, and may absorb or block light in a blue wavelength band that is not converted by the light conversion layer QDL1. Accordingly, the second sub-pixel may emit light in a green wavelength band.

Each of the third color filters CF3 located in the third sub-pixel may transmit light in a blue wavelength band. Therefore, each of the third color filters CF3 may transmit light in a blue wavelength band emitted from the light-emitting element LE and passing through the light-transmitting layer. Accordingly, the third sub-pixel may emit light in a blue wavelength band.

A fourth organic layer 1294 for planarization may be located on the plurality of color filters CF1, CF2, and CF3. The fourth organic layer 1294 may be formed of acryl resin, epoxy resin, phenolic resin, polyamide resin, polyimide resin or the like.

Figure 13:
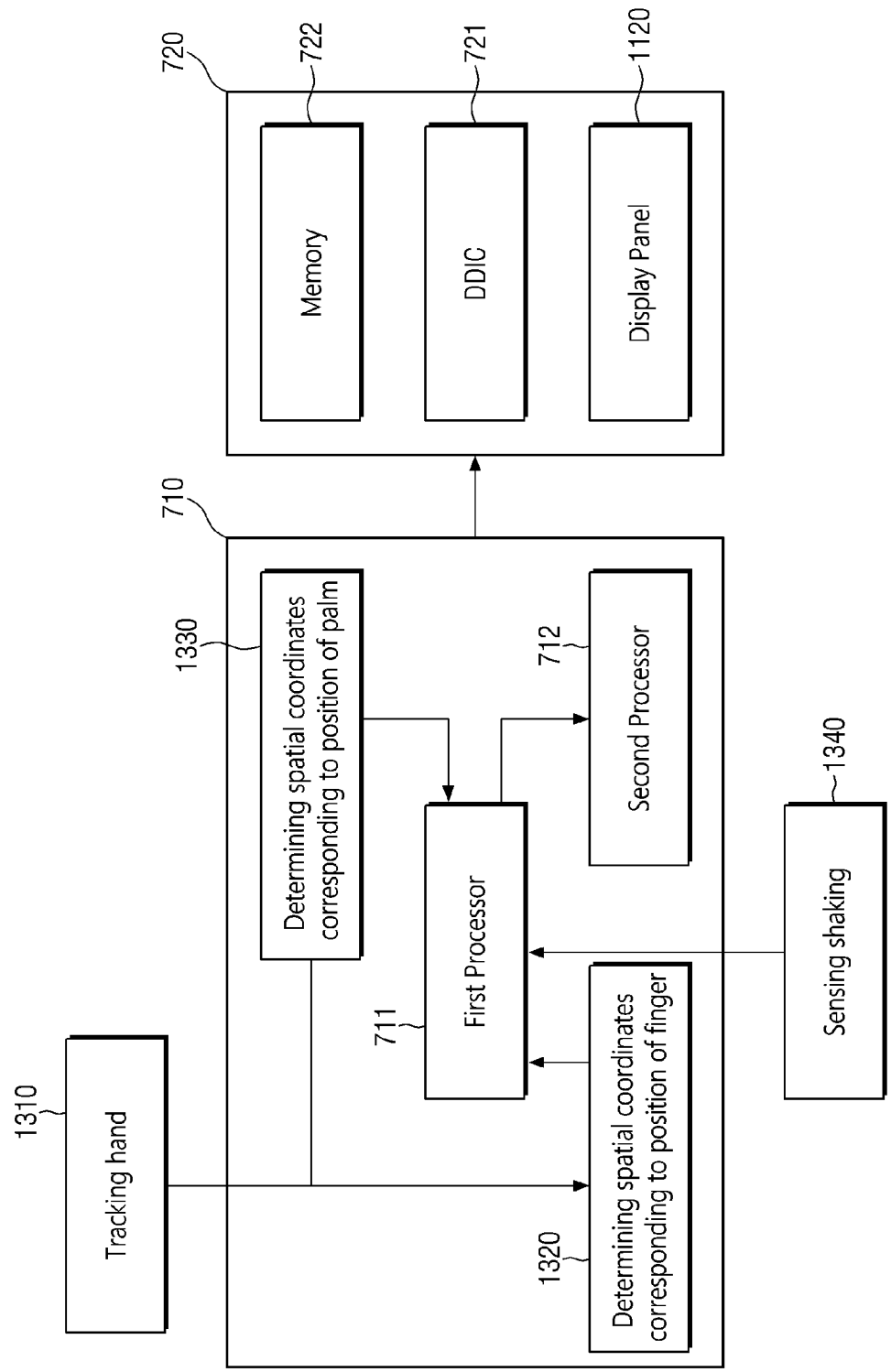
FIG. 13 is a conceptual diagram illustrating an operation of an electronic device according to one or more embodiments.

FIG. 13 is a conceptual diagram illustrating an operation of the electronic device 100 according to one or more embodiments. FIG. 13 describes an operation of the electronic device 100 described with reference to FIGS. 1 to 7.

Referring to FIG. 13, the processor 710 of the electronic device 100 tracks the user's hand to display a beam image 200 on the user's hand (see 1310 in FIG. 13). The processor 710 performs hand tracking by using the infrared sensors 321 and 322 or an infrared camera. Hand tracking includes an operation of determining spatial coordinates corresponding to the position of the finger 12 (see 1320 in FIG. 13), and includes an operation of determining spatial coordinates corresponding to the position of the palm 11 (see 1330 in FIG. 13).

The first processor 711 (e.g., a main processor) may perform a computation of determining spatial coordinates of each of the finger 12 and the palm 11. The first processor 711 may transmit the determined spatial coordinates of each of the finger 12 and the palm 11 to the second processor 712. The second processor 712 (e.g., a GPU, or an auxiliary processor) may adjust the size and resolution of the beam image 200 based on the inputted spatial coordinates and may generate (e.g., render) image data based on the adjusted size and resolution. The second processor 712 (e.g., a GPU) may control the display 720 to generate the beam image 200 based on the generated image data. The second processor 712 transmits image data generated according to an interface standard corresponding to the display 720 (e.g., a mobile industry processor interface (MIPI)) to the display 720.

The display 720 includes a memory 722, a display driver IC (DDIC) 721, and the display panel 1120. The DDIC 721 may store image data inputted from the processor 710 in the memory 740 and may drive the display panel 1120 to emit display light corresponding to the image data.

Meanwhile, the processor 710 senses the shaking of the electronic device 100 by using the gyro sensor 330 (see 1340 in FIG. 13). The processor 710 senses the movement of the electronic device 100 by using the gyro sensor 330 while the display 720 outputs the beam image 200. The processor 710 may determine the moving direction and acceleration of the electronic device 100, and may generate image data in which shaking is compensated based on the determined direction and acceleration. In addition, the processor 710 may change the posture of the display 720 based on the determined direction and acceleration. As described above, the processor 710 may control the driver 760 to change the posture of the display 720.

Figure 14:
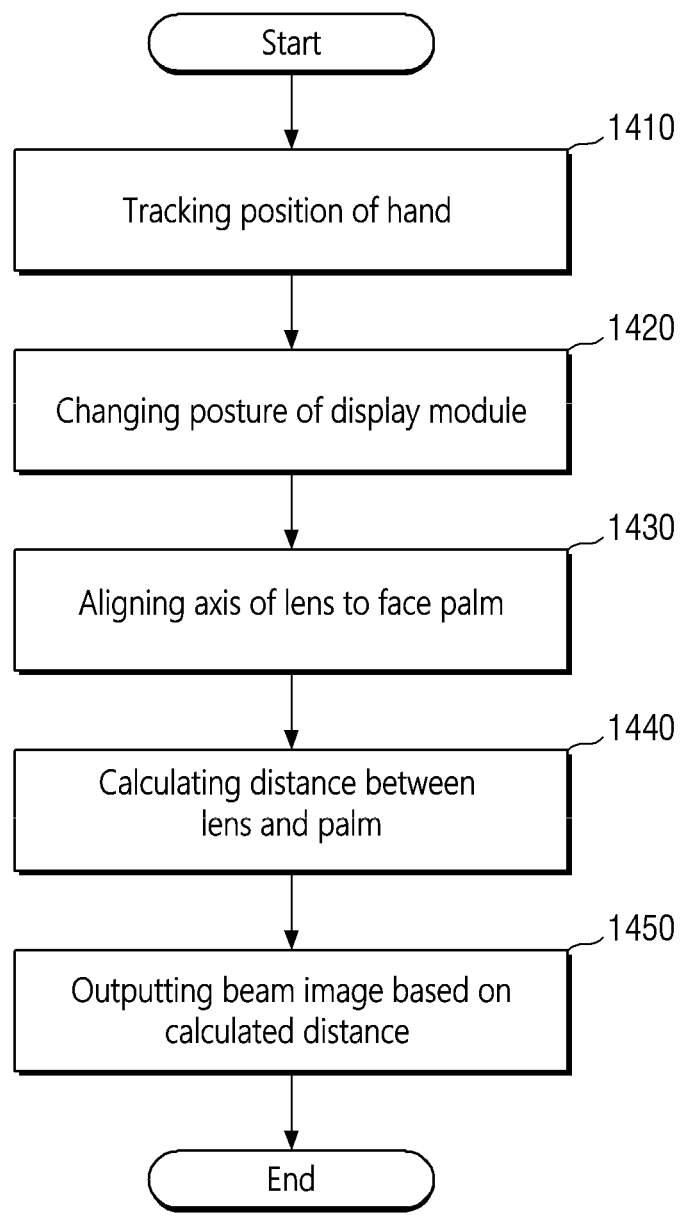
FIG. 14 is a flowchart illustrating an operation of displaying a beam image by an electronic device according to one or more embodiments.

FIG. 14 is a flowchart illustrating an operation of displaying the beam image 200 by the electronic device 100 according to one or more embodiments. FIG. 14 describes an operation of the electronic device 100 described with reference to FIGS. 1 to 7.

Operations illustrated in FIG. 14 may be executed by the processor 710 of the electronic device 100. For example, the processor 710 may control the electronic device 100 to execute the operations illustrated in FIG. 14 based on the execution of an instruction or an application program stored in the memory 740.

At least some of the operations illustrated in FIG. 14 may be omitted. Before or after at least some of the operations illustrated in FIG. 14, at least some of the operations mentioned with reference to other drawings in the present disclosure may be additionally inserted. Hereinafter, an operation of an electronic device according to one or more embodiments will be described with reference to FIG. 14.

In an operation 1410, the electronic device 100 tracks the user's hand to display the beam image 200 on the user's hand. The processor 710 may perform hand tracking by using the infrared sensors 321 and 322 or an infrared camera. Hand tracking may include an operation of determining spatial coordinates corresponding to the position of the finger 12 and an operation of determining spatial coordinates corresponding to the position of the palm 11.

In an operation 1420, the electronic device 100 changes the posture of, or the orientation or position of, the display 720 based on the determined spatial coordinates. The electronic device 100 may change the posture of the display 720 by using the posture controller 750. The operation of changing the posture of the display 720 may include an operation of driving at least one of the first to third gimbals 810, 820, and/or 830. For example, the operation of changing the posture of the display 720 may include at least one of the operation of driving the first gimbal 810 to rotate the display 720 about a first axis, the operation of driving the second gimbal 820 to rotate the display 720 about a second axis, and/or the operation of driving the third gimbal 830 to rotate the display 720 about a third axis.

In an operation 1430, the electronic device 100 may align the axis of the lens 341 to face the palm 11 by adjusting the axis of the lens 341. For example, the electronic device 100 may drive a shift motor to tilt or shift-move the axis of the lens 341 such that the center of the display portion 1101 of the display 720 and the lens 341 and the user's palm 11 are in a straight line.

In an operation 1440, the electronic device 100 may calculate a distance between the lens 341 and the palm 11 on which the beam image 200 is to be displayed. To this end, the electronic device 100 may include a plurality of infrared sensors 321 and 322 or an infrared camera. For example, the electronic device 100 may calculate a distance between the electronic device 100 and the palm 11 of the user by using the plurality of infrared sensors 321 and 322 spaced apart from each other at intervals. The electronic device 100 may determine the calculated distance as the distance between the palm 11 and the lens 341. The electronic device 100 may calculate the distance between the palm 11 and the lens 341 by using various distance-measuring sensors in related art without using the plurality of infrared sensors 321 and 322.

In an operation 1450, the electronic device 100 outputs the beam image 200 based on the calculated distance between the palm 11 and the lens 341. The second processor 712 of the electronic device 100 (e.g., a GPU) may adjust the size and resolution of the beam image 200 based on the calculated distance and may generate (e.g., render) image data based on the adjusted size and resolution. The second processor 712 (e.g., a GPU) may control the display 720 to generate the beam image 200 based on the generated image data. The second processor 712 transmits image data generated according to an interface standard corresponding to the display 720 (e.g., a mobile industry processor interface (MIPI)) to the display 720. The display 720 may output the beam image 200 to be displayed on the palm 11 based on the inputted image data.

Figure 15:
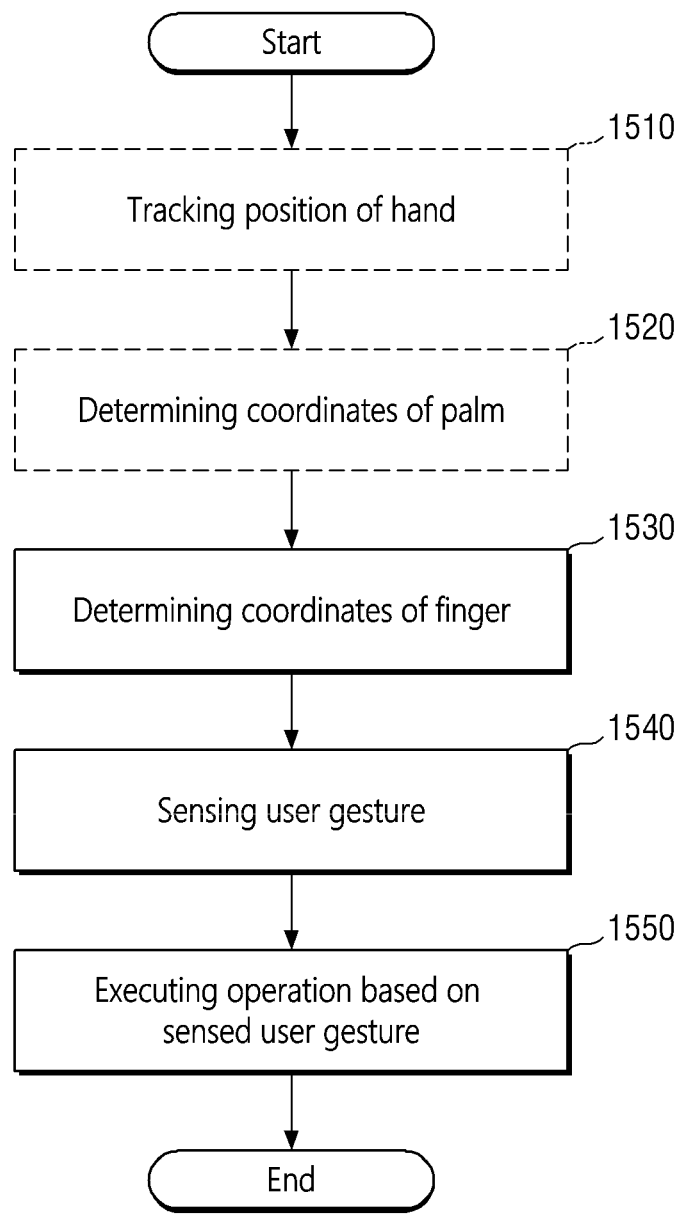
FIG. 15 is a flowchart illustrating an operation of sensing a user gesture by an electronic device according to one or more embodiments.
Figure 16:
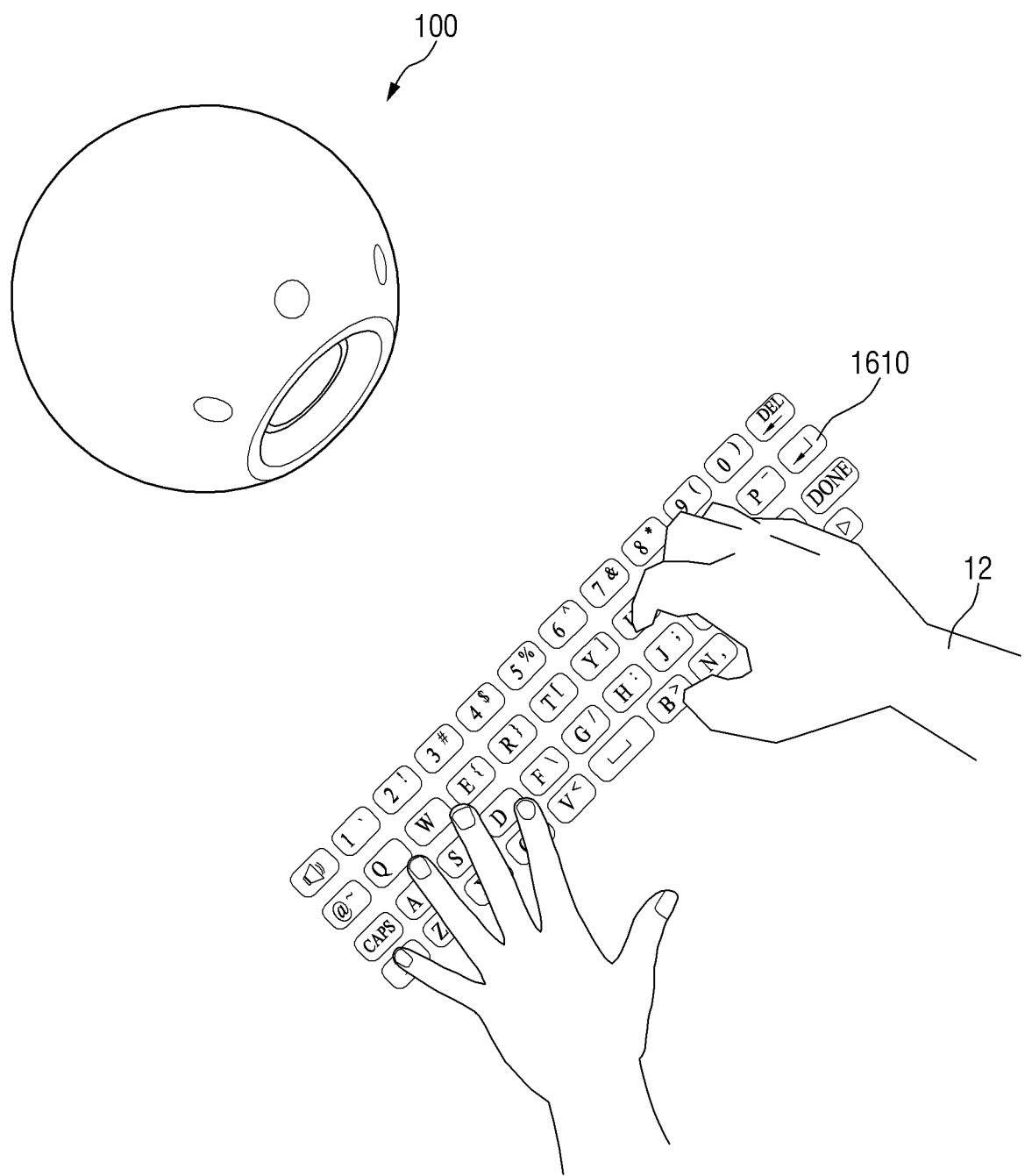
FIG. 16 is an example illustrating a state in which an electronic device displays a text input window according to one or more embodiments.

FIG. 15 is a flowchart illustrating an operation of sensing a user gesture by the electronic device 100 according to one or more embodiments. FIG. 16 is an example illustrating a state in which the electronic device 100 displays a text input window according to one or more embodiments. FIGS. 15 and 16 describe the operation of the electronic device 100 described with reference to FIGS. 1 to 7.

Operations illustrated in FIG. 15 may be executed by the processor 710 of the electronic device 100. For example, the processor 710 may control the electronic device 100 to execute the operations illustrated in FIG. 15 based on the execution of an instruction or an application program stored in the memory 740.

At least some of the operations illustrated in FIG. 15 may be omitted. Before or after at least some of the operations illustrated in FIG. 15, at least some of the operations mentioned with reference to other drawings in the present disclosure may be additionally inserted. Hereinafter, an operation of an electronic device according to one or more embodiments will be described with reference to FIG. 15.

In an operation 1510, the electronic device 100 performs hand tracking by using the infrared sensors 321 and 322 or the infrared camera while the beam image 200 is outputted. The electronic device 100 may include the plurality of infrared sensors 321 and 322 and may execute hand tracking by using the infrared sensors 321 and 322. For example, the electronic device 100 may include the first infrared sensor 321 and the second infrared sensor 322 exposed to the outside through a part of the main body 310, and the first infrared sensor 321 and the second infrared sensor 322 may be located at intervals.

In an operation 1520, the electronic device 100 may determine the position coordinates of the palm 11 (e.g., coordinates corresponding to the position of the palm 11) by using the plurality of infrared sensors 321 and 322 (or a plurality of infrared cameras). The operation 1510 to the operation 1520 may be substantially the same as or similar to the operation 1410 described with reference to FIG. 14. Accordingly, the operation 1510 to the operation 1520 may be omitted.

In an operation 1530, the electronic device 100 may determine the coordinates of the finger 12 while the beam image 200 is outputted. In addition to tracking the position of the palm 11, the electronic device 100 tracks the position of the fingers 12, and determines coordinates corresponding to the position of each of the tracked fingers 12. The electronic device 100 executes the tracking of the finger 12 to sense a user input. Because the electronic device 100 does not include a touch screen unlike a general smart phone or tablet PC, a graphic user interface may be implemented by sensing a user's gesture.

In an operation 1540, the electronic device 100 may sense a user gesture based on the determined coordinates of the finger 12. For example, the electronic device 100 may determine the coordinates of each of the fingers 12, and may sense the movement of each of the fingers 12 after determining the coordinates of each of the fingers 12. That is, after identifying the position of each of the fingers 12, the electronic device 100 senses a change in how each of the identified fingers 12 moves. The electronic device 100 determines the type of user gesture based on the sensing of the position change of each of the fingers 12. For example, FIG. 16 illustrates a state in which the electronic device 100 outputs a text input window 1610 as a part of the beam image 200. As illustrated in FIG. 16, while the text input window 1610 is displayed, the electronic device 100 senses a user gesture on the text input window 1610 (e.g., a text input by using the finger 12).

In an operation 1550, the electronic device 100 may execute an operation based on the sensed user gesture. As described with reference to FIG. 16, the operation based on the user gesture includes an operation of sensing a user input to the text input window 1610. In addition, in one or more embodiments, an operation based on a user gesture may further include the operations of the graphic user interface based on a touch input, such as selection, movement, enlargement, reduction, copying, or pasting of at least one object included in the beam image 200.

FIG. 17 is a flowchart illustrating an operation of compensating shaking by the electronic device 100 according to one or more embodiments. FIG. 17 describes an operation of the electronic device 100 described with reference to FIGS. 1 to 7.

Operations illustrated in FIG. 17 may be executed by the processor 710 of the electronic device 100. For example, the processor 710 may control the electronic device 100 to execute the operations illustrated in FIG. 17 based on the execution of an instruction or an application program stored in the memory 740.

At least some of the operations illustrated in FIG. 17 may be omitted. Before or after at least some of the operations illustrated in FIG. 17, at least some of the operations mentioned with reference to other drawings in the present disclosure may be additionally inserted. Hereinafter, an operation of an electronic device according to one or more embodiments will be described with reference to FIG. 17.

In an operation 1710, the electronic device 100 senses the movement of the electronic device 100 while the beam image 200 is outputted. That is, the electronic device 100 senses the shaking of the electronic device 100 while the beam image 200 is outputted. For example, the user may move while wearing the electronic device 100 around the neck in the form of a necklace. The movement of the user causes the electronic device 100 to shake, which may become a factor for reducing or preventing the likelihood of the beam image 200 being stably displayed on the palm of the hand, which is a fixed object. While the beam image 200 is outputted, the electronic device 100 may sense the movement of the electronic device 100, that is, shaking, and may compensate the movement to improve image quality.

In an operation 1720, the electronic device 100 determines the moving direction and acceleration of the electronic device 100 by using the gyro sensor 330 (or an acceleration sensor). The gyro sensor 330 is a type of inertial sensor, and is a sensor that measures acceleration and angular velocity, and that provides the measured information to the processor 710. The gyro sensor 330 may be divided into an accelerometer and a gyroscope. An accelerometer is a measuring device that measures acceleration when the electronic device 100 performs an accelerated motion, and a gyroscope is a sensor that measures an angular velocity of rotation when the electronic device 100 rotates.

In an operation 1730, the electronic device 100 changes the posture, and/or the orientation and/or the position, of the display 720 based on the determined direction and acceleration. The processor 710 of the electronic device 100 compensates the posture of the display 720 in the opposite direction in which the electronic device 100 moves by using the posture controller 750. Accordingly, the electronic device 100 may display the beam image 200 outputted from the display 720 over a fixed, corresponding location (e.g., palm 11) even if the electronic device 100 moves or shakes. Additionally, the posture controller 750 may change the posture of the display 720 such that the beam image 200 generated from the display 720 is directed at the user's palm 11 and fingers 12.

In an operation 1740, the electronic device 100 may align the axis of the lens 341 to face the palm 11 by adjusting the axis of the lens 341. For example, the electronic device 100 may drive a shift motor to tilt or shift-move the axis of the lens 341 such that the center of the display portion 1101 of the display 720 and the lens 341 and the user's palm 11 are in a substantially straight line. An operation 1740 may be substantially the same as or similar to the operation 1440 described with reference to FIG. 14.

In an operation 1750, the electronic device 100 may output the beam image 200 in which shaking is compensated based on the determined direction and acceleration. The electronic device 100 recalculates the distance between the palm 11 and the lens 341 when the shaking or movement of the electronic device 100 is sensed. The electronic device 100 outputs the beam image 200 based on the calculated distance between the palm 11 and the lens 341. The second processor 712 of the electronic device 100 (e.g., a GPU) may adjust the size and resolution of the beam image 200 based on the calculated distance, and may generate (e.g., render) image data based on the adjusted size and resolution. After sensing the movement of the electronic device 100, the electronic device 100 may omit the operation 1740 to the operation 1750. That is, without executing an operation of moving the lens 341 or regenerating the beam image 200 in which shaking is compensated, the electronic device 100 may only change the posture of the display 720 based on the determined direction and acceleration.

In concluding the detailed description, those skilled in the art will appreciate that many variations and modifications can be made to the preferred embodiments without substantially departing from the aspects of the present disclosure. Therefore, the disclosed embodiments are used in a generic and descriptive sense only and not for purposes of limitation.

What is claimed is:

1. An electronic device comprising:
    a main body;
    a sensor exposed to an outside through the main body;
    a display inside the main body, and configured to output a beam image through a lens exposed through the main body;
    a posture controller outside the display, and comprising gimbals configured to change a posture of the display;
    a driver configured to drive the posture controller; and
    a processor that is configured to:
        track a user's hand position using the sensor;
        change the posture of the display based on the tracked hand position;
        move the lens such that an axis of the lens faces a palm of the user's hand;
        calculate a distance between the palm and the lens; and
        control the display to output the beam image generated based on the calculated distance.

2. The electronic device of claim 1, wherein the sensor comprises a first infrared sensor, and a second infrared sensor spaced apart from the first infrared sensor.

3. The electronic device of claim 2, wherein the first infrared sensor and the second infrared sensor have a field of view that is greater than or equal to about 60 degrees.

4. The electronic device of claim 1, wherein the gimbals comprise:
    a first gimbal configured to rotate the display about a first axis;
    a second gimbal configured to rotate the display about a second axis that is perpendicular to the first axis; and
    a third gimbal configured to rotate the display about a third axis that is perpendicular to the first axis and the second axis.

5. The electronic device of claim 4, wherein the driver comprises a first driving motor configured to drive the first gimbal, a second driving motor configured to drive the second gimbal, and a third driving motor configured to drive the third gimbal, and
    wherein the first to third driving motors comprise:
        an annular piezoelectric element;
        a fixing portion contacting the annular piezoelectric element, and comprising a protrusion;
        a disk-shaped rotating portion contacting the fixing portion; and
        a friction ring between the fixing portion and the disk-shaped rotating portion, and contacting the protrusion.

6. The electronic device of claim 1, wherein the display comprises:
    a display portion comprising at least one display panel and a prismatic portion for transmitting display light emitted from the display panel to the lens; and
    a lens portion adjacent to the display portion, and comprising the lens and a shift motor for shifting the lens.

7. The electronic device of claim 6, wherein the lens portion comprises a reflective member,
    wherein the display portion comprises an optical sensor for receiving light reflected by the reflective member, and
    wherein the processor is configured to sense light reflected by the reflective member using the optical sensor, and to control the shift motor to align the lens portion and the display portion based on the sensed light.

8. The electronic device of claim 6, wherein the display comprises:
    a first display panel for emitting red light;
    a second display panel for emitting green light; and
    a third display panel for emitting blue light, and
    wherein the prism portion comprises a trichroic prism for transmitting the red light, the green light, and the blue light to the lens.

9. The electronic device of claim 6, wherein the processor is configured to:
    determine finger coordinates while outputting the beam image;
    sense a user gesture based on the determined finger coordinates; and
    perform a function based on the sensed user gesture.

10. The electronic device of claim 9, wherein the function based on the sensed user gesture comprises an operation of sensing a user input to a text input window.

11. The electronic device of claim 1, wherein at least one display panel comprises a semiconductor wafer substrate, and an organic light-emitting diode (OLED) on the semiconductor wafer substrate.

12. The electronic device of claim 1, wherein the sensor further comprises a gyro sensor, and
    wherein the processor is configured to:
    sense a movement of the electronic device using the gyro sensor while outputting the beam image;
    determine a direction and an acceleration of the electronic device; and
    change a posture of the display based on the determined direction and the determined acceleration.

13. A method for driving an electronic device that comprises a sensor exposed to an outside through a main body, a display inside the main body for outputting a beam image through a lens exposed through the main body, a posture controller outside the display and comprising gimbals configured to change a posture of the display, and a driver configured to drive the posture controller, the method comprising:
    tracking a user's hand position using the sensor;
    changing the posture of the display based on the user's hand position;
    moving the lens such that an axis of the lens faces a palm;
    calculating a distance between the palm and the lens; and controlling the display to output the beam image generated based on the calculated distance.

14. The method of claim 13, wherein the gimbals comprise:
- a first gimbal configured to rotate the display about a first axis;
- a second gimbal configured to rotate the display about a second axis that is perpendicular to the first axis; and
- a third gimbal configured to rotate the display about a third axis that is perpendicular to the first axis and the second axis.

15. The method of claim 14, wherein the changing the posture of the display comprises at least one of:
- rotating the display about the first axis by driving the first gimbal;
- rotating the display about the second axis by driving the second gimbal; or
- rotating the display about the third axis by driving the third gimbal.

16. The method of claim 13, wherein the display comprises:
- a display portion comprising at least one display panel and a prismatic portion for transmitting display light emitted from the display panel to the lens; and
- a lens portion adjacent to the display portion, and comprising the lens and a shift motor for shifting the lens.

17. The method of claim 16, wherein the lens portion comprises a reflective member,
wherein the display portion comprises an optical sensor for receiving light reflected by the reflective member, and
wherein the method further comprises:
- sensing the light reflected by the reflective member using the optical sensor; and
- controlling the shift motor to align the lens portion and the display portion based on the sensed light.

18. The method of claim 13, further comprising:
- determining finger coordinates while outputting the beam image;
- sensing a user gesture based on the determined finger coordinates; and
- performing a function based on the sensed user gesture.

19. The method of claim 18, wherein the function based on the sensed user gesture comprises sensing a user input to a text input window.

20. The method of claim 13, wherein the sensor comprises a gyro sensor, and
wherein the method further comprises:
- sensing a movement of the electronic device using the gyro sensor while outputting the beam image,
- determining a direction and an acceleration of the electronic device, and
- changing a posture of the display based on the determined direction and the determined acceleration.

* * * * *